US012746643B2

(12) United States Patent
Li

(10) Patent No.: US 12,746,643 B2
(45) Date of Patent: Sep. 29, 2026

(54) BIASED PAWL RATCHETING WRENCH

(71) Applicant: Great Star Tools USA, Inc., Saddle Brook, NJ (US)

(72) Inventor: Yueming Li, Hangzhou City (CN)

(73) Assignee: Great Star Tools USA, Inc., Saddle Brook, NJ (US)

( * ) Notice: Subject to any disclaimer, the term of this patent is extended or adjusted under 35 U.S.C. 154(b) by 253 days.

(21) Appl. No.: 18/535,718

(22) Filed: Dec. 11, 2023

(65) Prior Publication Data

US 2024/0109167 A1 Apr. 4, 2024

Related U.S. Application Data

(63) Continuation-in-part of application No. 16/941,160, filed on Jul. 28, 2020, now Pat. No. 11,839,955, (Continued)

(51) Int. Cl.
*B25B 13/46* (2006.01)
*B25B 13/04* (2006.01)
*F16F 1/26* (2006.01)

(52) U.S. Cl.
CPC ............ *B25B 13/465* (2013.01); *B25B 13/04* (2013.01); *F16F 1/26* (2013.01)

(58) Field of Classification Search
CPC ... B25B 13/461; B25B 13/462; B25B 13/463; B25B 13/465; F16F 1/26
(Continued)

(56) References Cited

U.S. PATENT DOCUMENTS 127,902 A 6/1872 Leonard
2,395,681 A * 2/1946 Odlum ................. B25B 13/465 192/43.2
(Continued)

FOREIGN PATENT DOCUMENTS

CN 102145477 8/2011
CN 202656099 1/2013
(Continued)

OTHER PUBLICATIONS

Australian Patent Office Examination Report issued on Australian patent application No. 2014334804, dated Jul. 7, 2017, 5 pages.
(Continued)

*Primary Examiner* — Brian D Keller
*Assistant Examiner* — Alberto Saenz
(74) *Attorney, Agent, or Firm* — BLANK ROME LLP

(57) ABSTRACT

A ratchet wrench comprises: a handle; a first member having an annular surface provided thereon with a plurality of teeth parallel to an axial direction thereof; a second member configured to rotate circumferentially with respect to the annular surface, the second member having at least two recesses arranged circumferentially around it; and at least two first drive transmission members disposed in the respective recesses of the second member, each of the first drive transmission members comprising at least one ratchet tooth, the first drive transmission members configured to be engaged with the teeth to transmit movement in a first direction between the first member and the second member, wherein each of the first drive transmission members is in a different engagement configuration with the teeth, wherein one of the first member and the second member is coupled to the handle and configured to be driven by the handle to rotate.

13 Claims, 25 Drawing Sheets

Related U.S. Application Data which is a continuation of application No. 14/508,721, filed on Oct. 7, 2014, now Pat. No. 10,730,168.

(60) Provisional application No. 61/936,134, filed on Feb. 5, 2014, provisional application No. 61/890,621, filed on Oct. 14, 2013.

(58) Field of Classification Search
USPC .............................. 81/60, 62, 63, 63.1, 63.2
See application file for complete search history.

(56) References Cited

U.S. PATENT DOCUMENTS

| | | | |
|---|---|---|---|
| 2,963,929 | A | 12/1960 | Barnes |
| 3,086,405 | A | 4/1963 | Fleming |
| 3,466,523 | A | 9/1969 | Brook |
| 3,534,836 | A | 10/1970 | Dane |
| 3,906,822 | A | 9/1975 | Hertelendy |
| 4,466,523 | A | 8/1984 | De Carolis |
| 4,644,830 | A | 2/1987 | Bailey |
| 5,282,830 | A | 2/1994 | Reynolds |
| 5,690,202 | A | 11/1997 | Myers |
| 5,765,669 | A | 6/1998 | Adams |
| 5,878,635 | A | 3/1999 | Hsieh |
| 5,937,981 | A | 8/1999 | Adams |
| 6,044,731 | A | 4/2000 | Hsieh |
| 6,050,512 | A | 4/2000 | Jung |
| 6,206,160 | B1 | 3/2001 | Chen |
| 6,357,323 | B2 | 3/2002 | Chi |
| 6,530,296 | B1 | 3/2003 | Liao |
| 6,615,693 | B1 | 9/2003 | Liao |
| 6,769,330 | B2 | 8/2004 | Chang |
| 6,862,955 | B1 | 3/2005 | Shu-Sui |
| 8,726,766 | B1 | 5/2014 | Wu |
| 9,140,317 | B2 | 9/2015 | Buchanan |
| 9,597,782 | B2 | 3/2017 | Abel |
| 10,730,168 | B2 | 8/2020 | Solar |
| 2001/0003933 | A1 | 6/2001 | Chi |
| 2004/0107802 | A1 | 6/2004 | Wu |
| 2013/0032008 | A1 | 2/2013 | Lee |
| 2013/0340574 | A1 | 12/2013 | Buchanan |
| 2015/0059534 | A1 | 3/2015 | Wang |
| 2015/0135908 | A1 | 5/2015 | Solar |

FOREIGN PATENT DOCUMENTS

| | | | |
|---|---|---|---|
| DE | 29702864 | U1 | 4/1997 |
| EP | 0876558 | A1 | 11/1998 |
| EP | 3057740 | | 8/2016 |
| WO | 2012028869 | A1 | 3/2012 |
| WO | 2012028870 | A1 | 3/2012 |
| WO | 2015057440 | A1 | 4/2015 |

OTHER PUBLICATIONS

Australian Patent Office, Examination Report issued on Australian patent application No. 2014334804, dated Jul. 11, 2017, 5 pages.
CIPO, office action issued on Canadian patent application No. 2,927,055, dated Nov. 25, 2020, 3 pages.
European Patent Office examination report issued on European patent application No. 14854690.6, dated Aug. 2, 2018, 4 pages.
European Patent Office Supplementary European Search Report issued on European patent application No. 14854690.6, dated May 2, 2017, 9 pages.
European Patent Office, examination report issued on European patent application No. 14854690.6, dated Aug. 8, 2018, 5 pages.
European Patent Office, Supplementary European Search Report issued on European patent application No. 14854690.6, dated May 19, 2017, 9 pages.
IMPI, office action issued on Mexican patent application No. MX/a/2016/004758, dated Jul. 17, 2020, 6 pages.
International Search Report and Written Opinion for PCT/US2014/059613, mailed Jan. 7, 2015, 6 pages.
Mexican Institute of Industrial Property, Office Action issued on Mexican patent application No. MX/a/2016/004758, dated Aug. 15, 2019, 6 pages.
Mexican Institute of Industrial Property, Office Action issued on Mexican patent application No. MX/a/2016/004758, dated Feb. 5, 2020, 2 pages.
Mexican Institute of Industrial Property, Office Action issued on Mexican patent application No. MX/a/2016/004758, dated Jul. 24, 2019, 6 pages.
SIPO Office Action issued on Chinese patent application No. 201480056632.8 dated Apr. 1, 2017, 12 pages.
SIPO Office Action issued on Chinese patent application No. 201480056632.8, dated May 28, 2018, 16 pages.

* cited by examiner

BIASED PAWL RATCHETING WRENCH

RELATED APPLICATIONS

This application is a continuation-in-part (CIP) application claiming benefit of U.S. patent application Ser. No. 16/941,160, filed on Jul. 28, 2020, now U.S. Pat. No. 11,839,955, which is a continuation application of U.S. patent application Ser. No. 14/508,721, filed on Oct. 7, 2014, now U.S. Pat. No. 10,730,168, which claims benefit of U.S. Provisional Application No. 61/890,621 filed on Oct. 14, 2013, which also claims benefit of U.S. Provisional Application No. 61/936,134 filed on Feb. 5, 2014. The disclosures of those applications are incorporated herein in their entirety by reference.

FIELD OF THE INVENTION

The present application relates to ratchet wrenches and more particularly to a biased pawl ratcheting wrench.

DESCRIPTION OF THE PRIOR ART

Ratchet wrenches are generally known in the art. For example, U.S. Pat. No. 6,530,296 describes a unidirectional ratchet wrench consisting of a wrench body, a ratchet, an expanding ring and a plurality of clamping blocks, i.e. pawls. The ratchet is rotatably mounted inside the wrench body and has the pawls evenly spaced around the ratchet to engage the inner surface of the wrench body. Two covers are mounted on opposite openings of a toothed cavity of the wrench body to enclose the ratchet.

Similarly, U.S. Pat. No. 6,615,693 describes a ratchet including a head and a driving member rotatably received in the head. A plurality of teeth are defined on the inside surface of the head and a plurality of notches are defined on the outer periphery of the driving member. Each notch has a pawl received therein which engages the teeth of the inside surface of the head. A spring ring is mounted to collars formed on each of the pawls and pulls the pawl inward toward the driving member.

Still further, U.S. Pat. No. 6,769,330 describes a ratchet wrench including a driving head having an inner peripheral gear, a wheel rotatably engaged in the driving head and having two openings formed in the outer peripheral portion. Two pawls are received in the openings of the wheel and each has a number of outer teeth for engaging with the inner peripheral gear of the driving head, and each has one end for being biased to engage into the end portions of the openings of the wheel by two springs engaging the pawls.

While each of the above-referenced wrenches generally works for their intended purposes, each of the described wrenches relies upon a wire spring that may be difficult to manufacture, to assemble, e.g., may require specialized tools, and/or may be prone to failure based upon the size and fragility of the spring itself.

In addition, for each of the known ratchet wrenches, a torque applied to the handle is communicated to the output end through the pawls serving as a transmission mechanism. During reverse ratcheting of the handle, the pawls (i.e., the transmission mechanism) slide idly over the ratchet and make a clicking sound when passing by each tooth. Therefore, during torqueing and reversing of the handle, there is always an idle ratcheting increment corresponding to one tooth. That is, when the handle reaches a limit torqueing position, it can perform another torqueing action only after it has been reversely pivoted by an angle not less than a central angle corresponding to one tooth. For example, if 60 teeth are evenly spaced on the circumferential periphery of the ratchet wheel, then each tooth corresponds to a central angle of 6°. In this case, when the handle reaches the limit torqueing position, it can perform another torqueing action only after it has been reversely pivoted by 6°. As another example, if 72 teeth are evenly spaced on the circumferential periphery of the ratchet wheel, then each tooth corresponds to a central angle of 5°. In this case, when the handle reaches the limit torqueing position, it can perform another torqueing action only after it has been reversely pivoted by 5°. In order to allow the handle to be reversely pivoted by a smaller angle, the number of teeth may be increased. However, at given tooth dimensions and strength of the product, increasing the number of teeth will inevitably expand the size of the ratchet. Moreover, at a given ratchet size, increasing the number of teeth means shrinkage of each tooth, which will reduce the reliability of engagement between the pawls and the teeth and deteriorate force transmission performance. Further, a relative small number of teeth may lead to high resistance to reverse ratcheting, tending to cause failure of the ratchet during use and significant fluctuations. Therefore, at a given outer diameter dimension, in order to ensure satisfactory strength of the product, infinitely increasing the number of ratchet teeth is impractical. On the other hand, fewer teeth will lead to smaller reverse ratcheting angle increments, affecting use in limited spaces.

As such, there is a recognized need in the art for an improved ratchet wrench assembly.

SUMMARY OF THE INVENTION

In view of the above-described disadvantages of the prior art, the problem sought to be solved by the present application is how to provide a ratchet wrench, which encounters less resistance during reverse ratcheting.

To this end, the present application provides a ratchet wrench comprising: a handle;

a first member having an annular surface provided thereon with a plurality of teeth parallel to an axial direction thereof;

a second member configured to rotate circumferentially with respect to the annular surface, the second member having at least two recesses arranged circumferentially around it; and at least two first drive transmission members disposed in the respective recesses of the second member, each of the first drive transmission members comprising at least one ratchet tooth, the first drive transmission members configured to be engaged with the teeth to transmit movement in a first direction between the first member and the second member, wherein each of the first drive transmission members is in a different engagement configuration with the teeth, wherein one of the first member and the second member is coupled to the handle and configured to be driven by the handle to rotate.

Further, at least one of the first drive transmission members may be fully engaged with the teeth, and at least one of the first drive transmission members may be partially engaged with the teeth.

Further, a plurality of the first drive transmission members may be partially engaged with the teeth, wherein the plurality of first drive transmission members partially engaged with the teeth are in different engagement configurations with the teeth.

Further, at least one of the first drive transmission members may be disengaged from the teeth.

Further, the first drive transmission members may be evenly distributed circumferentially around the first member.

Further, the ratchet wrench may further comprise at least two second drive transmission members disposed in the respective recesses of the second member, each of the second drive transmission members comprising at least one ratchet tooth, the second drive transmission members configured to be able to be engaged with the teeth to transmit movement in a second direction between the first member and the second member, wherein each of the second drive transmission members is in a different engagement configuration with the teeth, wherein the second direction is opposite to the first direction, wherein when the first member and the second member move with respect to the first direction, the first drive transmission members are in a working state and the second drive transmission members are in a non-working state, and when the first member and the second member move with respect to the second direction, the second drive transmission members are in a working state and the first drive transmission members are in a non-working state.

Further, at least one of the second drive transmission members may be fully engaged with the teeth, and at least one of the second drive transmission members may be partially engaged with the teeth.

Further, a plurality of the second drive transmission members may be partially engaged with the teeth, wherein the plurality of second drive transmission members partially engaged with the teeth are in different engagement configurations with the teeth.

Further, at least one of the second drive transmission members may be disengaged from the teeth.

Further, the second drive transmission members may be evenly distributed circumferentially around the first member.

Further, the recesses may be each bordered by an inclined face on one side and a generally upright face on the other side, both extending from an outer periphery of the second member.

Further, the ratchet wrench may further comprise a resilient biasing element located between the upright face and the first drive transmission members, the resilient biasing element providing a biasing force against the first drive transmission members to urge the first drive transmission members into contact with the teeth.

Further, the resilient biasing elements may be a spring ring comprising a generally planar surface and at least one resilient biasing leaf extending from the planar surface.

Further, the resilient biasing elements may be a coil spring.

Further, each of the recesses may define opposing a first opening and a second opening in a circumferential periphery of the second member and may be provided therein with one pair of first transmission member and second drive transmission member, wherein ratchet tooth of each of the first drive transmission member extends out of the first opening, and ratchet tooth of each of the second drive transmission member extends out of the second opening.

Further, a resilient biasing element may be disposed between the pair of first drive transmission member and second drive transmission member.

Further, the resilient biasing element may be a coil spring.

Further, each of the recesses may be provided therein with one pair of first drive transmission member and second drive transmission member and may have opposing inclined faces for respectively contacting the first drive transmission member and the second drive transmission member, wherein the second member further comprises an annular support provided at an end thereof, the annular support defining elongate through slots at locations thereof corresponding to the respective drive transmission members; the drive transmission members extend at one end into the elongate through slots; and the elongate through slots are inclined with respect to radial directions at angles equal to those of the respective inclined faces.

To the above end, the present application also provides a ratchet wrench comprising: a handle;

a first member having an annular surface provided thereon with a plurality of teeth parallel to an axial direction thereof;

a second member configured to rotate circumferentially with respect to the annular surface, the second member having a plurality of recesses arranged circumferentially around it; and a plurality of first drive transmission members each disposed in one of the plurality of recesses, each of the first drive transmission members comprising at least one ratchet tooth, the first drive transmission members configured to be engaged with the teeth to transmit movement in a first direction between the first member and the second member, wherein when the first member rotates in the first direction relative to the first member, at least one of the plurality of first drive transmission members is fully engaged with the teeth, and the remaining plurality of first drive transmission members are partially engaged with the teeth, wherein one of the first member and the second member is coupled to the handle and configured to be driven by the handle to rotate.

Further, the ratchet wrench may further comprise a plurality of second transmission members, wherein each of the plurality of first drive transmission members is disposed in one of the plurality of recesses; each of the second drive transmission members comprises at least one ratchet tooth; the second drive transmission members are configured to be engaged with the teeth to transmit movement in a second direction between the first member and the second member, wherein when the first member rotates in the second direction relative to the first member, at least one of the plurality of second drive transmission members is fully engaged with the teeth, and the remaining plurality of second drive transmission members are partially engaged with the teeth, and the second direction is opposite to the first direction.

The present application offers at least the benefits as follows:

In the ratchet wrench provided in the present application, the different engagement configurations between the ratchet and the drive transmission members provide more transmission gear positions at a given number of teeth, which lead to higher transmission efficiency, precise engagement, reduced fluctuation and better elimination of tooth gaps. Moreover, the increased gear positions enable reverse ratcheting with smaller angle increments and ensure sufficient strength, thus allowing use in even smaller spaces. Further, resistance to reverse ratcheting between the ratchet and pawls is suppressed, effectively reducing wear and tear.

Below, the concept, structural details and resulting technical effects of the present application will be further described with reference to the accompanying drawings to provide a full understanding of the objects, features and effects of the application.

DETAILED DESCRIPTION OF THE PREFERRED EMBODIMENTS

Figure 1:
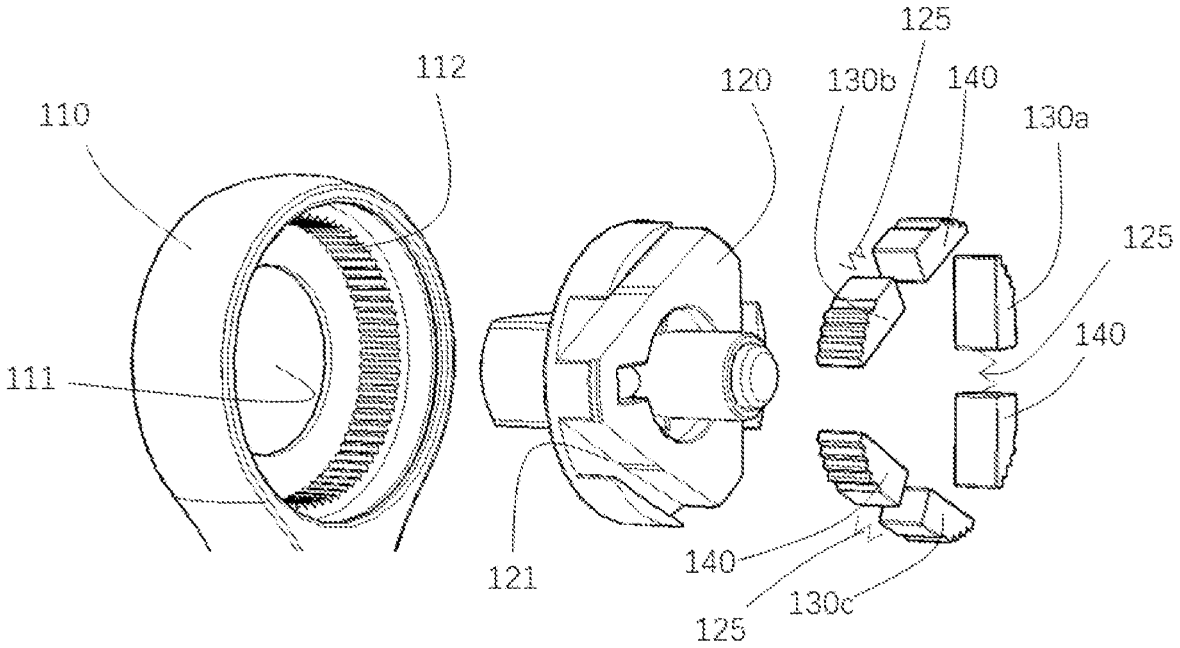
FIG. 1 is an exploded view showing the internal structure of Example 1 of the present application.

The following description of example methods and example apparatus is not intended to limit the scope of the description to the precise form or forms detailed herein. Instead, the following description is intended to be illustrative so that others may follow its teachings.

Throughout the figures, parts of the same structures are marked with the same reference numerals, and like elements with similar structures or functions are marked with like reference numerals. The dimensions and thickness of each component in the accompanying drawings are arbitrarily shown, and the present application is not limited to any particular dimensions and thickness of each component. Certain parts may be shown somewhat exaggerated in thickness in the interest of clarity.

I. Ratchet Mechanism

The present application provides a ratchet mechanism comprising a first member, a second member and at least two first drive transmission members. The first member is annular and defines teeth across its entire circumferential peripheral surface. The teeth may be defined on either an outer circumferential peripheral surface or an inner circumferential peripheral surface of the first member. The second member can rotate circumferentially with respect to the first member and is used to bear first drive transmission members with at least one ratchet tooth, which can be engaged with the teeth of the annular member. The first drive transmission members are capable of movement transmission. Specifically, when the first member is rotated in a first direction under the action of an external force acting on the first member, it will come into engagement with the first drive transmission members and thereby transmit the movement to the second member, causing the second member to move in a predetermined direction. The first direction may be either clockwise or counterclockwise. It will be appreciated that the second member may be alternatively configured as an active member. In this case, the second member may move in the first direction under the action of an external force exerted on the second member, and the first drive transmission member may then transmit the movement to the first member, causing the first member to rotate in a predetermined direction. During movement transmission, each first drive transmission member is in a different engagement configuration with the teeth of the first member. Here, at least two engagement configurations are possible, including: a first engagement configuration, also referred herein as a full engagement configuration, in which the first drive transmission members are completely engaged with the teeth of the first member; and a second engagement configuration, also referred herein as a partial engagement configuration, in which the first drive transmission members are partially engaged with the teeth of the first member. During movement transmission, each first drive transmission member periodically switches between those engagement configurations with rotation of the ratchet mechanism.

Depending on the number of first drive transmission members, more partial engagement configurations are possible. For example, in some embodiments, three first drive transmission members may be used, in which a first first drive transmission member is fully engaged, a second first drive transmission member is one-third engaged with the teeth of the first member, and a third first drive transmission member is two-third engaged with the teeth of the first member; when four first drive transmission members are used, a first first drive transmission member may be in a full engagement configuration, while the remaining three first drive transmission members are all in partial engagement configurations, which may be respectively one-fourth, half and three-fourth engagement configurations; and so forth.

Configuring the first drive transmission members so that each of them is in different engagement configuration can ensure that the ratchet mechanism provides more gear positions without increasing the number of teeth on the first member, which can result in higher transmission efficiency, reduced fluctuations and better elimination of tooth gaps. Thus, desirable strength can be guaranteed, and more accurate movement can be achieved. Providing more gear positions within a limited space enables smaller reverse ratcheting angle increments while ensuring sufficient strength. This allows the ratchet mechanism to have a more compact size and better movement transmission performance, making it usable in even smaller spaces. Further, less resistance will be encountered during reverse ratcheting of the ratchet mechanism, reducing the wear and tear of the ratchet mechanism.

In the ratchet mechanism of the application, at least two second drive transmission members may be added, which enable movement transmission between the first and second members during rotation of the ratchet mechanism in a second direction, which is opposite to the first direction. The second drive transmission members may work in a similar way to the first drive transmission members, except that the second drive transmission members do not function at all during rotation in the first direction while the first drive transmission members do not function at all during rotation in the second direction. By incorporating both the first and second drive transmission members, the ratchet mechanism is bidirectionally operable, with more gear positions being provided in both directions.

The ratchet mechanism of the application is useful in manual tools such as ratchet wrenches, ratchet screwdrivers and bidirectional wrenches and enables continuous rotation of these tools within a limited space. It will be appreciated that the ratchet mechanism of the application is not limited to being used in manual tools; rather, it can be used in any tool operating by providing a torque through rotation.

The ratchet mechanism of the application will be described in detail below by way of a number of examples.

Example 1

FIGS. 1 to 10 show the structure of Example 1.

Figure 2:
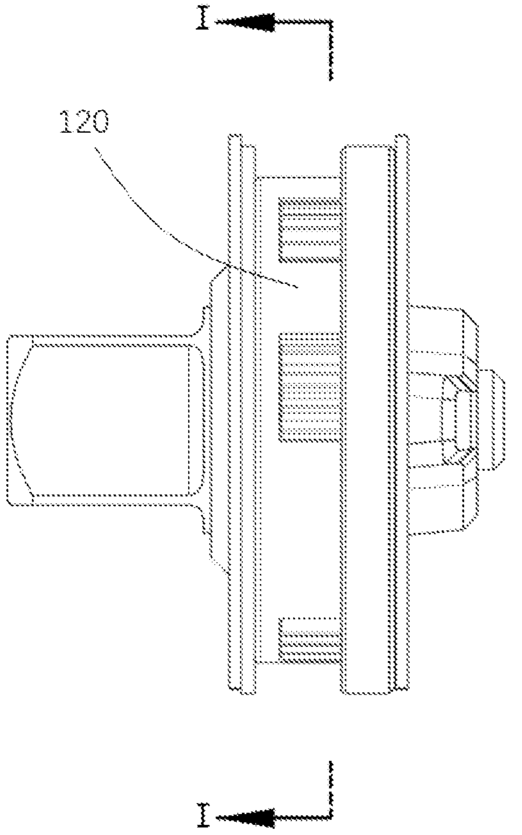
FIG. 2 is a front view of Example 1 of the present application.
Figure 3:
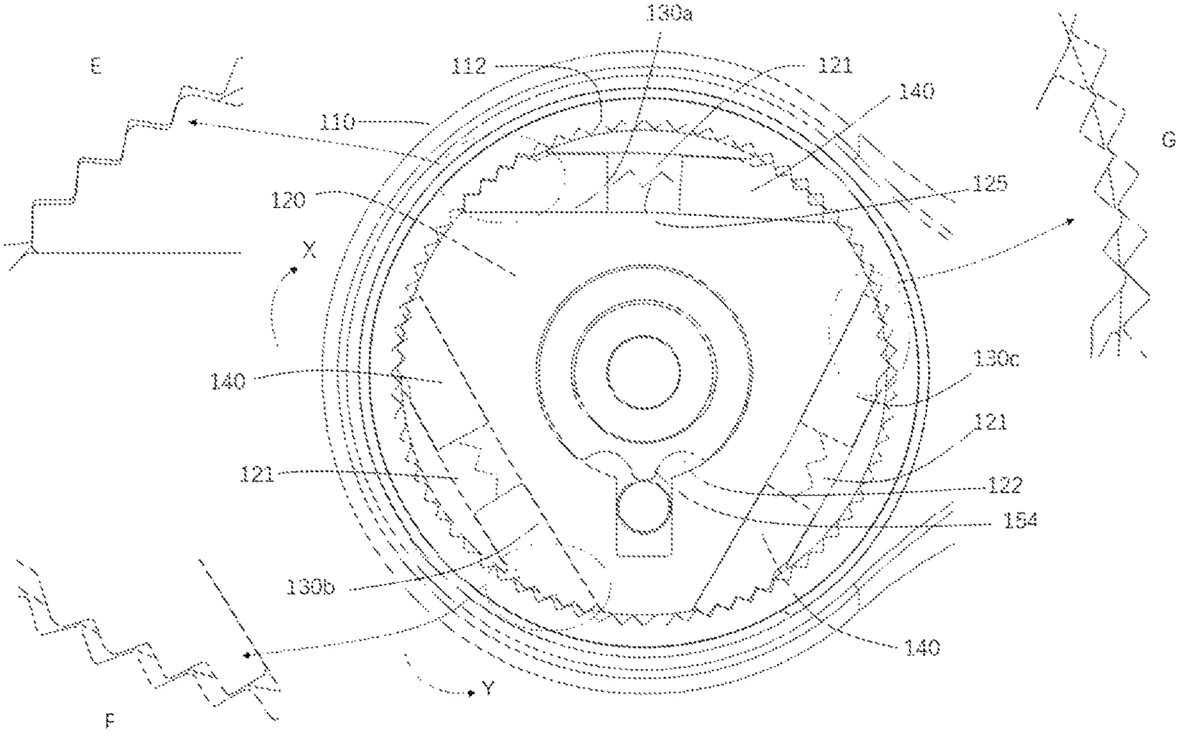
FIG. 3 is a cross-sectional view of FIG. 2 taken along I-I.

As shown in FIGS. 1, 2 and 3, in this Example, the ratchet mechanism 100 includes a first member 110, a second member 120 and three first drive transmission members 130.

The first member 110 is an annular member including an annular body defining an axially-extending through bore, which in turn defines a cavity 111 having a circumferentially-extending wall. The wall faces radially inward with respect to the annular member, and is provided thereon with a plurality of teeth 112 extending in parallel to one another. Each tooth 112 may extend in an axial direction of the first member 110, i.e., in parallel to an axis of the first member 110.

The teeth 112 may extend in the axial direction of the first member 110 from its one end to the other. Alternatively, they may extend across only a partial length of the wall. That is, the teeth 112 are not present in part of the axial extent of the wall.

Figure 4:
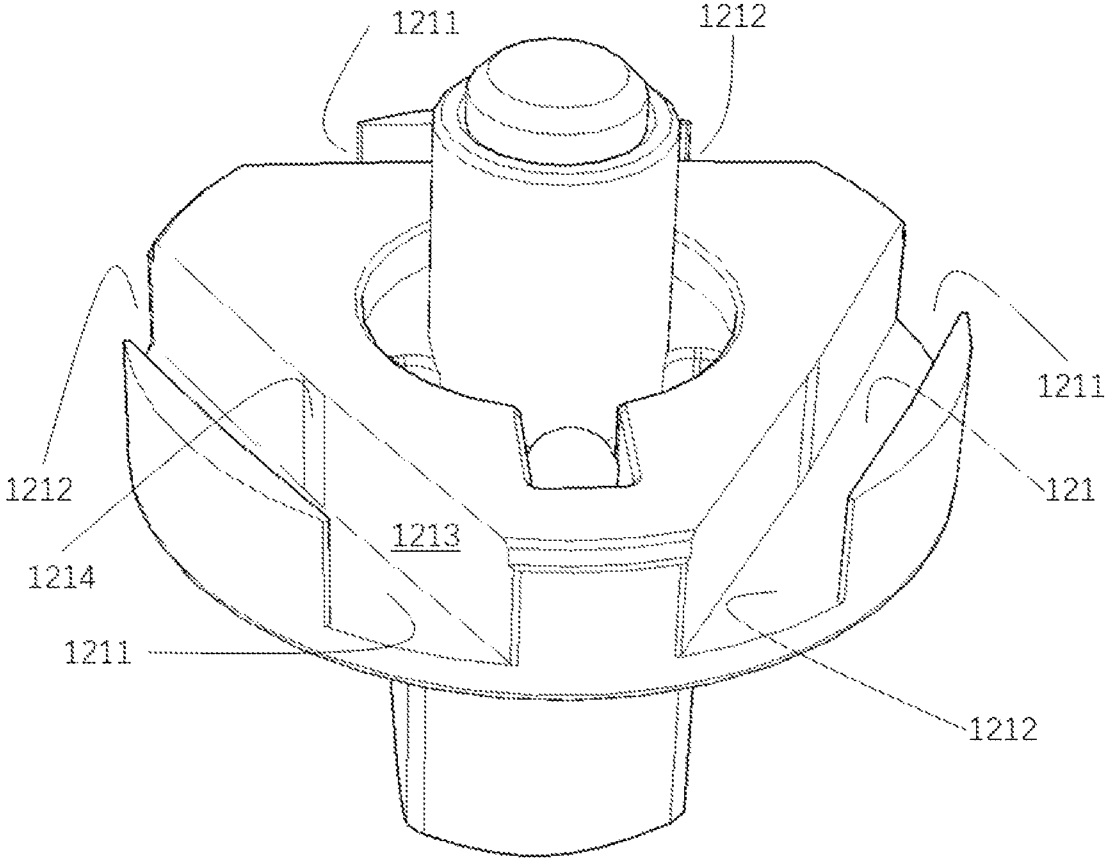
FIG. 4 is a schematic diagram showing the structure of a second member in Example 1 of the present application.

Referring to FIGS. 1 and 4, the second member 120 is at least partially received in the cavity 111. The second member 120 defines three receiving recesses 121 for receiving the first drive transmission members 130. The three receiving recesses 121 may be evenly spaced circumferentially around the second member 120. Each receiving recess 121 defines, at its one end, a first opening 1211 facing the first member 110. Referring to FIG. 3, each of the first drive transmission members 130 is in a respective one of the receiving recesses 121. The first drive transmission members 130 are partially passed through the first openings 1211 and can engage the teeth 112 of the first member 110.

Figure 5:
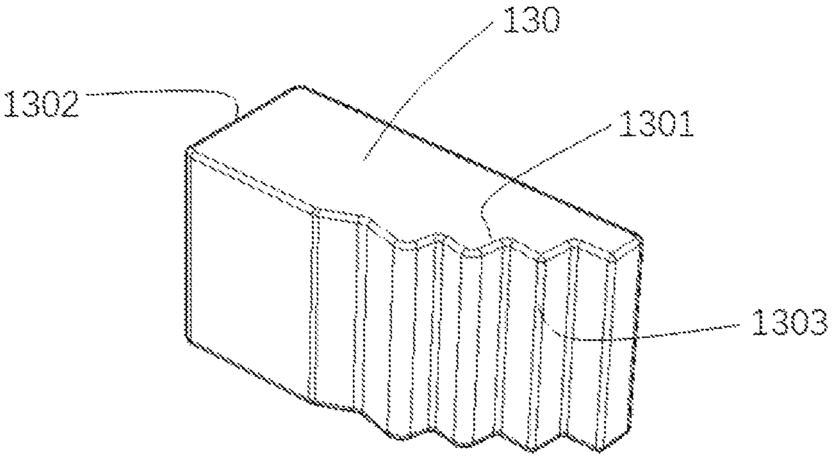
FIG. 5 is a schematic diagram showing the structure of a drive transmission member in Example 1 of the present application.

As shown in FIG. 5, each first drive transmission member 130 is substantially wedge-shaped and has a first end 1301 and a second end 1302, which oppose each other. The first end 1301 is provided thereat with at least one ratchet tooth 1303, which is passed through the first opening 1211 and can engage the teeth 112 of the first member 110. In some embodiments, the first end 1301 of the first drive transmission members 130 may be configured as an arcuate side wall with the same curvature as the wall of the cavity 111 of the first member 110. A plurality of ratchet teeth 1303 may be provided on the first end 1301. Referring to FIG. 3, the second end 1302 is disposed in the receiving recess 121. Opposite side faces of the first drive transmission member 130 between the first end 1301 and the second end 1302 contact respective side walls of the receiving recess 121 so that the first drive transmission member 130 is supported in the receiving recess 121.

In this Example, as shown in FIG. 3, the first member 110 is an active member. That is, the first member 110 can move in a first direction X under the action of an external force acting on the first member 110. At this time, the movement is transmitted by the first drive transmission members 130 to the second member 120, causing the second member 120 to move in a predetermined direction. The predetermined direction may be a direction that is the same as the first direction X, or may be a direction opposite to the first direction X, depending on a direction of engagement of the first drive transmission members 130 with the first member 110. Here, the predetermined direction is configured to be the same as the first direction X. When the first member 110 is driven in the direction opposite to the first direction X, the first drive transmission members 130 will no longer transmit movement, and their ratchet teeth 1303 will slide over the teeth 112 of the first member 110 relative thereto, with the second member 120 remaining stationary. That is, reverse ratcheting of the ratchet mechanism 100 is achieved.

The three first drive transmission members 130 are in different engagement configurations with the teeth 112 of the first member 110. As shown in FIG. 3, when the first member 110 is driven in the first direction X, the first drive transmission member 130*a* is fully engaged with the teeth 112 of the first member 110, i.e., in a first configuration E. The first drive transmission member 130*b* is two-third engaged with the teeth 112 of the first member 110, i.e., in a second configuration F. The first drive transmission member 130*c* is one-third engaged with the teeth 112 of the first member 110, i.e., in a third configuration G. As the first member 110 is further rotated, the first drive transmission member 130*a* will become one-third engaged, i.e., in the third configuration G, the first drive transmission member 130*b* will be in the full engagement configuration, i.e., the first configuration E, and the first drive transmission member 130*c* will become two-third engaged, i.e., in the second configuration F; and so forth.

Through configuring the three first drive transmission members 130 in the different engagement configurations, the ratchet mechanism 100 is allowed to have more gear positions without increasing the number of teeth 112 in the first member 110. This results in improved transmission efficiency and engagement precision, thereby reducing fluctuations. It is well known that a greater number of teeth on the first member 110 will lead to higher transmission accuracy. However, it will correspondingly lead to a reduced thickness of each tooth 112, and hence insufficient strength and proneness to wear and tear or breakage, which will eventually make the ratchet mechanism 100 useless. However, strength augmentation necessitates reducing the number of teeth 112, which, however, will lead to a decrease in transmission accuracy. The ratchet mechanism 100 according to this application can ensure desirable strength while providing more gear positions and increased transmission accuracy. For example, in this Example, the first member 110 may have 72 teeth, and the three first drive transmission members 130 configured as discussed above can correspondingly provide 216 gear positions. This enables more accurate engagement, effective reductions in fluctuations, elimination of tooth gaps and reduced resistance to reverse ratcheting. If four such first drive transmission members 130 are included, 288 gear positions can be provided; and so forth.

As noted above, the first drive transmission members 130 are disposed and supported in the receiving recesses 121 of the second member 120. In order to ensure different lead angles of the ratchet teeth 1303 of the first drive transmission members 130, i.e., a different engagement configuration of each first drive transmission member 130 with the teeth 112 of the first member 110, planar contact surfaces 1213 of the receiving recesses 121 for contacting the first drive transmission members 130 may be designed with different inclinations. Specifically, in FIGS. 4 and 6, diagrams showing the structure of the receiving recesses 121, in which the first drive transmission members 130 are disposed. A middle part of a side wall of each receiving recess 121 defines a reference surface 1214, and the contact surface 1213 of the receiving recess 121 for contacting the first drive transmission member 130 is inclined at an angle α with respect to the reference surface 1214. All the remaining receiving recesses 121, in which the other first drive transmission members 130 are disposed, have a similar structure. The contact surface 1213 between each receiving recess 121 and the respective first drive transmission member 130 is inclined at an angle α, and the inclination angles α of the contact surfaces 1213 for the three receiving recesses 121 are different. Particular values of the angles α may be configured according to the lead angles required by the respective first drive transmission members 130.

The above-discussed structure allows transmission to occur in only one direction (i.e., the first direction X) in the ratchet mechanism 100.

Figure 6:
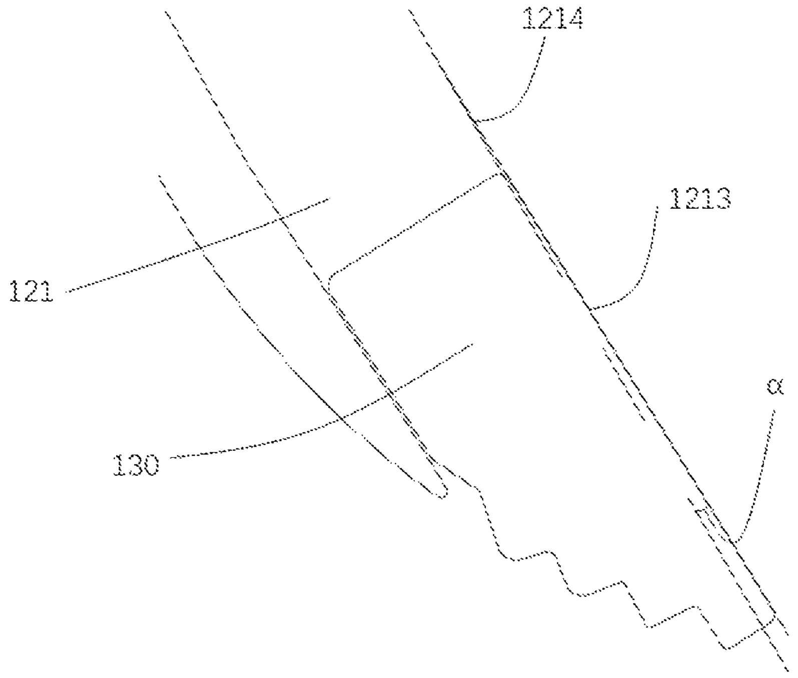
FIG. 6 schematically illustrates a lead angle of the drive transmission member according to Example 1 of the present application.

In order to enable bidirectional transmission in the ratchet mechanism 100, a set of three second drive transmission members 140 may be added to the ratchet mechanism 100. As shown in FIG. 3, the second drive transmission members 140 are shaped substantially the same as the first drive transmission members 130 and disposed in the receiving recesses 121, with ratchet teeth thereon being passed through second openings 1222 of the receiving recesses 121 and able to engage the teeth 112 of the first member 110. Further description thereof is omitted herein. When an external force acts on the first member 110 and drives the first member 110 to move in a second direction Y (which is a direction opposite to the first direction X here), the second drive transmission members 140 transmit the movement to the second member 120, causing the second member 120 to move in a predetermined direction. The predetermined direction may be a direction that is the same as the second direction Y, or may be a direction opposite to the second direction Y, depending on a direction of engagement of the second drive transmission members 140 with the first member 110. Here, the predetermined direction is configured to be the same as the second direction Y. When the first member 110 is driven in the direction opposite to the second direction Y, the second drive transmission members 140 will no longer transmit movement, and their ratchet teeth 1303 will slide over the teeth 112 of the first member 110 relative thereto, with the second member 120 remaining stationary. That is, reverse ratcheting of the ratchet mechanism 100 is achieved. Similar to the first drive transmission members 130, the second drive transmission members 140 are also in different engagement configurations with the teeth 112 of the first member 110, and the engagement configurations of the second drive transmission members 140 change periodically as the first member 110 is rotating. The different engagement configurations of the second drive transmission members 140 are also accomplished by different inclination angles of contact surfaces 1213 of the receiving recesses 121, as is shown in FIG. 6, and further description thereof is omitted herein for the sake of brevity.

Figure 7:
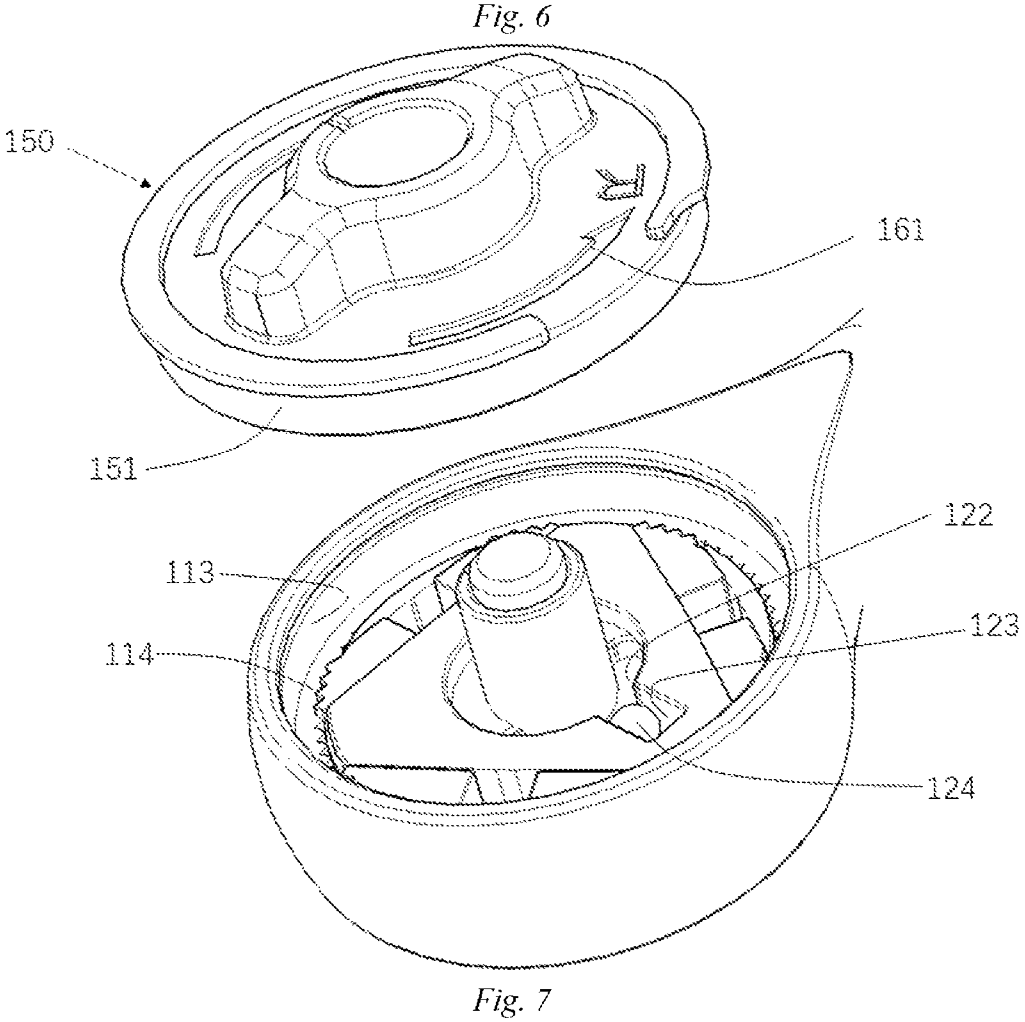
FIG. 7 is a schematic exploded view of Example 1 of the present application, showing an end cap.

Referring to FIG. 7, in order to enable the ratchet mechanism 100 to be switched between different directions of rotation, this Example further includes a switching assembly 150. When the switching assembly 150 is located at a first position, the ratchet mechanism 100 can be rotated forward. That is, the first member 110 can be driven to move in the first direction X, causing the first drive transmission members 130 to operate to transmit the movement to the second member 120. At this time, the second drive transmission members 140 do not function at all. When the switching assembly 150 is located at a second position, the ratchet mechanism 100 can be rotated backward. That is, the first member 110 can be driven to move in the second direction Y, causing the second drive transmission members 140 to operate to transmit the movement to the second member 120. At this time, the first drive transmission members 130 do not function at all.

Figure 3A:
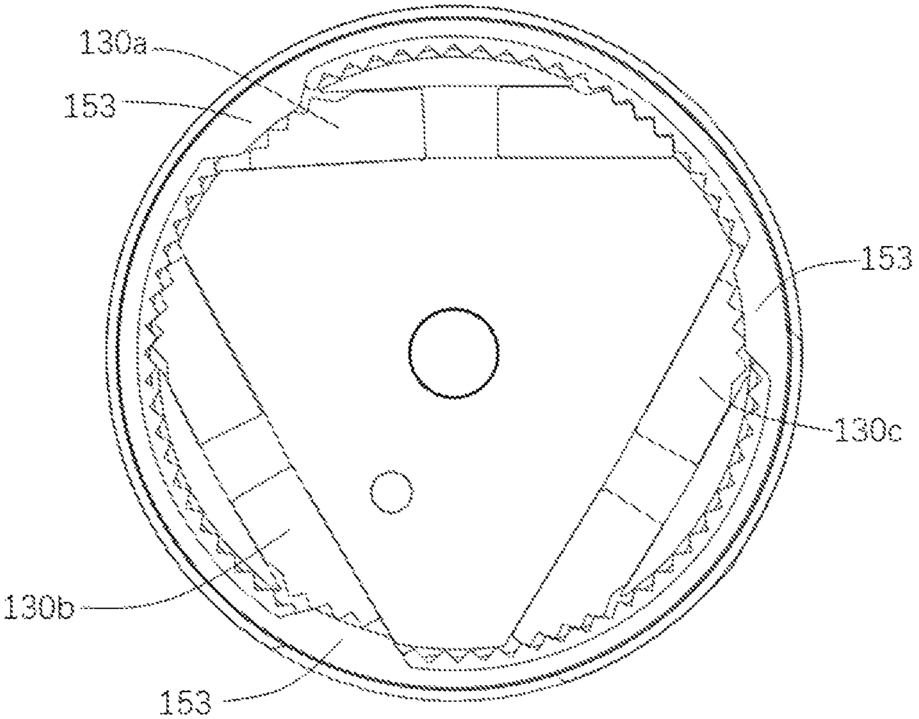
FIG. 3*a* schematically depicts blockage of first drive transmission members by stop blocks in Example 1 of the present application.
Figure 3B:
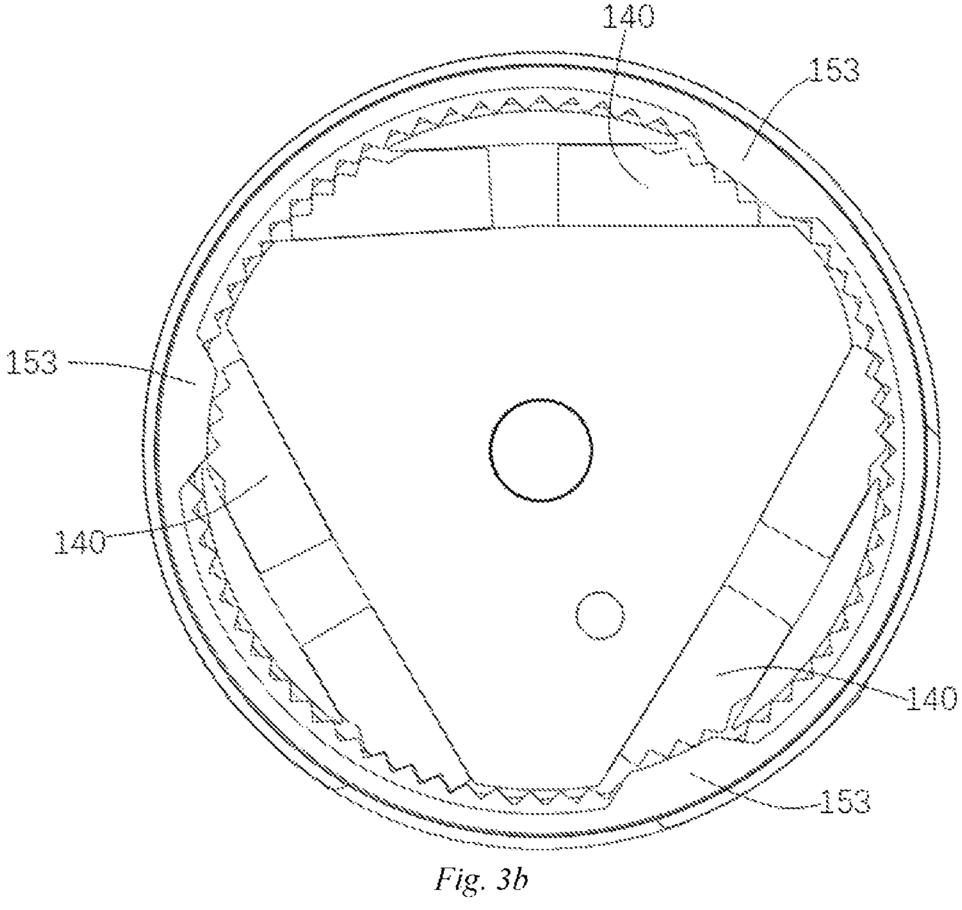
FIG. 3*b* schematically depicts blockage of second drive transmission members by the stop blocks in Example 1 of the present application.
Figure 8:
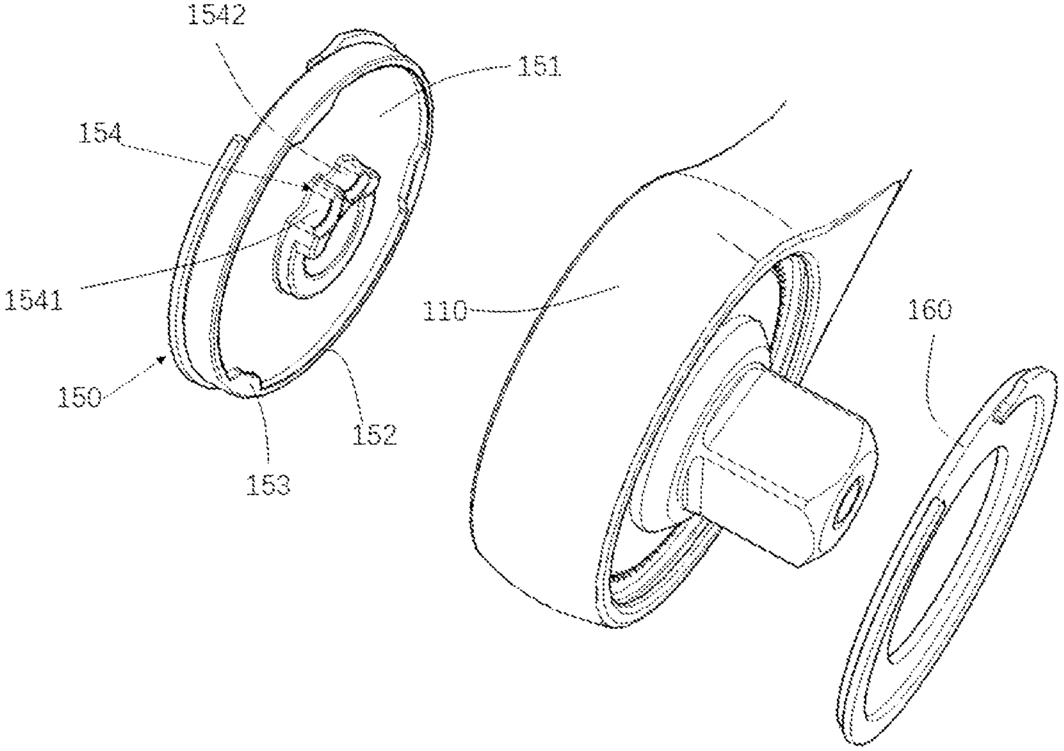
FIG. 8 is a schematic exploded view of Example 1 of the present application, showing a back side of the end cap.
Figure 9:
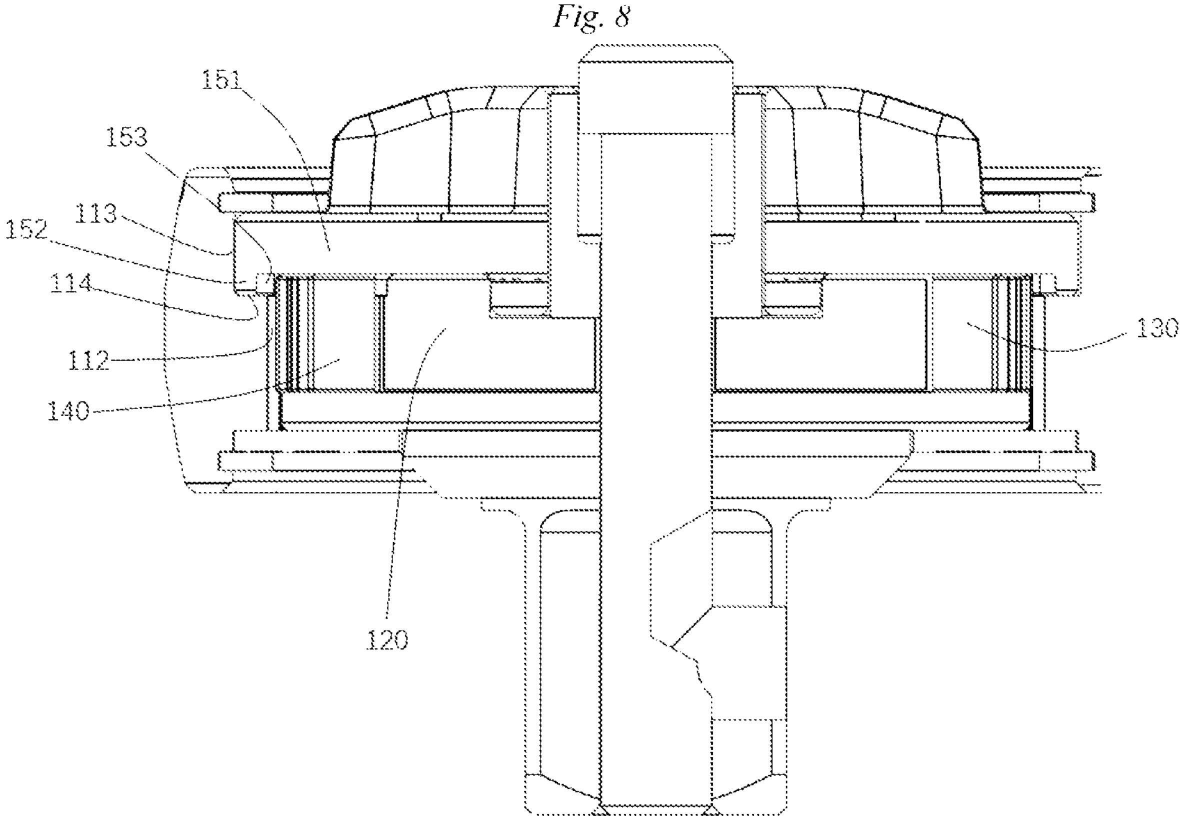
FIG. 9 is a cutaway view of Example 1 of the present application.
Figure 10:
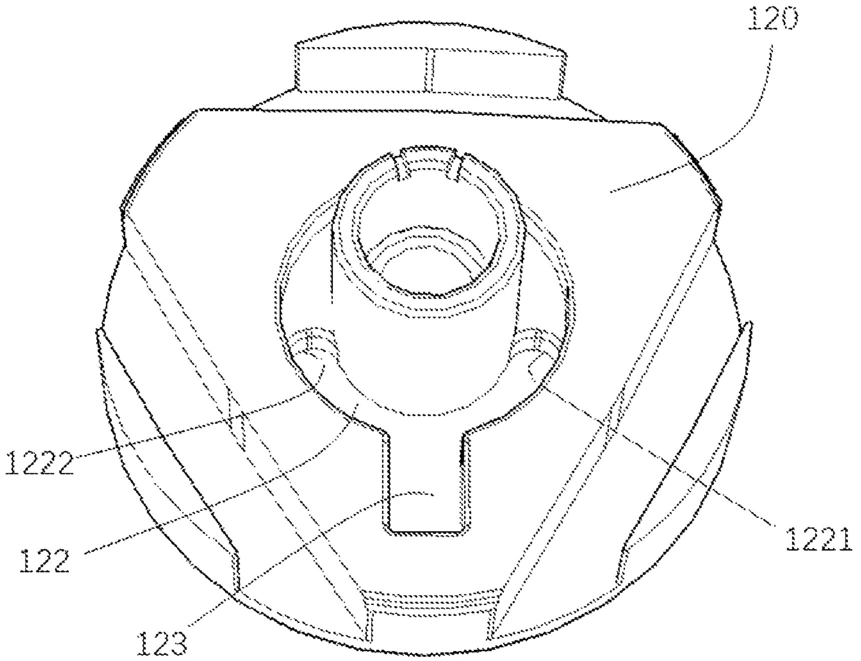
FIG. 10 schematically depicts a stop recess in the second member in Example 1 of the present application.

As shown in FIG. 7, the switching assembly 150 includes an end cap 151, and the first member 110 includes an annular portion 113 located at an axial end of the cavity 111. The end cap 151 can engage the annular portion 113 and thus be located at the end of the cavity 111. The annular portion 113 has an inner diameter different from that of the cavity 111, forming a step surface 114 on the top of the teeth 112. Referring to FIGS. 8 and 10, on a side face of the end cap 151 facing the teeth 112, there is an annular collar 152 projecting toward the second member 120 from the circumferential periphery of the side face. The collar 152 has protrusions protruding radially with respect to the end cap 151, which form stop blocks 153 corresponding to the drive transmission members. When the end cap 151 is placed at the end of the cavity 111, the collar 152 is located on top of the step surface 114. One side of the drive transmission members facing the end cap 151 is raised over the teeth 112 axially with respect to the cavity 111 so that the stop blocks 153 can be located between the drive transmission members and the annular portion 113. As shown in FIGS. 3*a* and 3*b*, if the end cap 151 is rotated to the first position, the stop blocks 153 will be aligned with and contact the second drive transmission members 140, disengaging the second drive transmission members 140 from the teeth 112. At this time, when the ratchet mechanism 100 is rotated in the first direction X, the second drive transmission members 140 do not function any longer, while the first drive transmission members 130 remain in engagement with the teeth 112 of the first member 110 and function to achieve movement transmission. If the end cap 151 is rotated to the second position, the stop blocks 153 will be aligned and contacted with the first drive transmission members 130, disengaging the first drive transmission members 130 from the teeth 112. At this time, when the ratchet mechanism 100 is rotated in the second direction Y, the first drive transmission members 130 do not function any longer, while the second drive transmission members 140 remain in engagement with the teeth 112 of the first member 110 and function to achieve movement transmission.

First resilient elements 125 are disposed between the first drive transmission members 130 and the second drive transmission members 140 to restore the drive transmission members to their previous position after disengagement from the stop blocks 153. Specifically, when the stop blocks 153 are contacting the first drive transmission members 130 or the second drive transmission members 140, the first resilient elements 125 are compressed and bias the first and second drive transmission members 130, 140.

The end cap 151 is further defined with a third position, where the stop blocks 153 are in contact neither with the first drive transmission members 130, nor with the second drive transmission members 140. Thus, both the first drive transmission members 130 and the second drive transmission members 140 engage the teeth 112 of the first member 110. As both interfere, no movement is transmitted.

Referring to FIGS. 7, 8 and 10, the end cap 151 defines a stopper 154 in a central area of the side face facing the cavity 111, and the second member 120 defines a stop recess 122 in positional correspondence with the stopper 154, which has a shape matching that of a path of movement of the stopper 154 as the end cap 151 is rotating. The stopper 154 extends into the stop recess 122 and can slide within the stop recess 122 when the end cap 151 is rotating. Upon reaching either of two ends of the stop recess 122, the stopper 154 will be stopped by the stop recess 122, preventing further movement of the end cap 151. This entails rotational stroke control over the end cap 151. Specifically, when the stopper 154 reaches a first end 1221 of the stop recess 122, the end cap 151 will be located at the first position where the stop blocks 153 disengage the second drive transmission members 140 from the teeth 112. When the stopper 154 reaches a second end 1222 of the stop recess 122, the end cap 151 will be located at the second position where the stop blocks 153 disengage the first drive transmission members 130 from the teeth 112. The stopper 154 is a projection, which projects from the end cap 151 toward the cavity 111 into the stop recess 122 at one end.

The ratchet mechanism 100 further includes a locking member for locking the ratchet mechanism 100 at the first or second position. As shown in FIGS. 7, 8 and 10, the second member 120 defines a locking channel 123 in communication at one end with a middle portion of the stop recess 122. A locking ball 124 is disposed within the locking channel 123. The stopper 154 includes a first pocket 1541 and a second pocket 1542, which are arranged in tandem. Both the first pocket 1541 and the second pocket 1542 are depressed radially with respect to the end cap 151. When the end cap 151 is located at the first position, the first pocket 1541 will be aligned with the locking channel 123, and the locking ball 124 will slide into the first pocket 1541, thereby locking the end cap 151 at the first position. When the end cap 151 is located at the second position, the second pocket 1542 will be aligned with the locking channel 123, and the locking ball 124 will slide into the second pocket 1542. A second resilient element 126 is disposed between the locking ball 124 and the end of the locking channel 123 away from the stop recess 122 (see FIG. 11) to bias the locking ball 124 after it is received in the first pocket 1541 or the second pocket 1542. When a portion joining the first pocket 1541 and the second pocket 1542 is aligned with the locking channel 123, the locking ball 124 will be blocked by the portion and stay within the locking channel 123. At this point, the end cap 151 is located at the third position.

The ratchet mechanism 100 further includes a trailing cap 160, which is disposed at an end of the cavity 111 of the first member 110 in opposition to the end cap 151 and encloses the cavity 111 together with the end cap 151, providing protection.

The end cap 151 may be provided thereon with a direction indication mark 161, which indicates a current direction of rotation of the ratchet mechanism 100.

In this Example, the ratchet mechanism 100 is capable of bidirectional movement, and during the movement in each direction, there is one set of drive transmission members in function. More transmission gear positions can be provided without increasing the number of teeth. The bidirectional movement is enabled by a switching assembly 150, which can switch the mechanism between directions of movement.

Example 2

Figure 11:
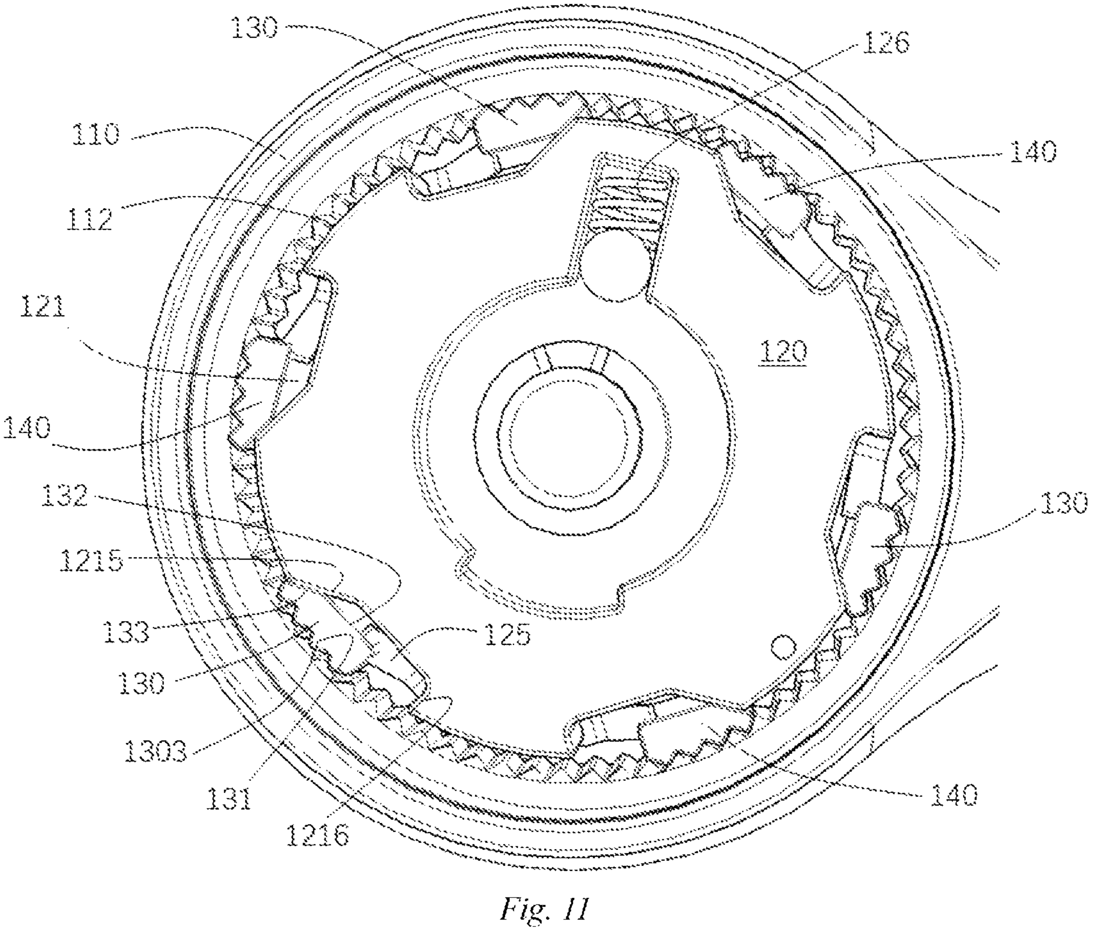
FIG. 11 is a schematic diagram showing the structure of Example 2 of the present application.

FIG. 11 shows the majority of the structure of Example 2. Most of the features of this Example are shared with Example 1, and only differences between the two Examples are described below.

As shown in FIG. 11, the second member 120 is generally annular and defines six receiving recesses 121 distributed circumferentially in its circumferential peripheral side wall, each provided therein with a drive transmission member. Three drive transmission members serve as first drive transmission members 130, and the remaining three drive transmission members serve as second drive transmission members 140. The first drive transmission members 130 and the second drive transmission members 140 alternate and are evenly distributed circumferentially around the second member 120.

Each drive transmission member is substantially of the same structure. Below, one of the first drive transmission members 130 will be described in detail as an example. The first drive transmission member 130 has a first side face 131 and a second side face 132, which oppose each other. The first side face 131 faces the first member and is provided thereon with at least one ratchet tooth 1303, which can engage the teeth 112 of the first member 110. The second side face 132 is situated within the receiving recess 121. The first side surface 131 and the second side face 132 are connected by an inclined face 133 in contact with a side wall of the receiving recess 121.

Each receiving recess 121 is substantially of the same structure, and one of them will be described in detail below as an example. The receiving recess 121 includes a first side wall 1215 and a second side wall 1216, which oppose each other circumferentially with respect to the second member 120. The first side wall 1215 is inclined, i.e., there is an angle between the first side wall 1215 and a radial direction of the second member 120. The first side wall 1215 contacts the inclined face 133 of the first drive transmission member 130 and thereby provides the first drive transmission member 130 with support. It is to be noted that the first side wall 1215 of each receiving recess 121 is inclined at a different angle with respect to a radial direction of the second member 120 and thereby the respective drive transmission members have different lead angles, which enable the drive transmission members to assume different engagement configurations with the teeth 112 of the first member 110. These engagement configurations are the same as those of Example 1, and further description thereof is omitted herein for the sake of brevity.

Each drive transmission member is joined to a first resilient element 125 at its end opposing the inclined face 133, and the other end of the resilient element 125 is joined to the receiving recess 121. The resilient element can bias the drive transmission member to serve the same purpose as in Example 1, i.e., restoring the drive transmission member to the position where it engages the first member 110.

Similar to Example 1, this Example is capable of bidirectional movement, and during the movement in each direction, there is one set of drive transmission members in action. More transmission gear positions can be provided without increasing the number of teeth. The bidirectional movement is enabled by a switching assembly similar to that of Example 1, which can switch the mechanism between directions of movement.

Example 3

FIGS. 12 to 15 show the structure of Example 3.

Figure 12:
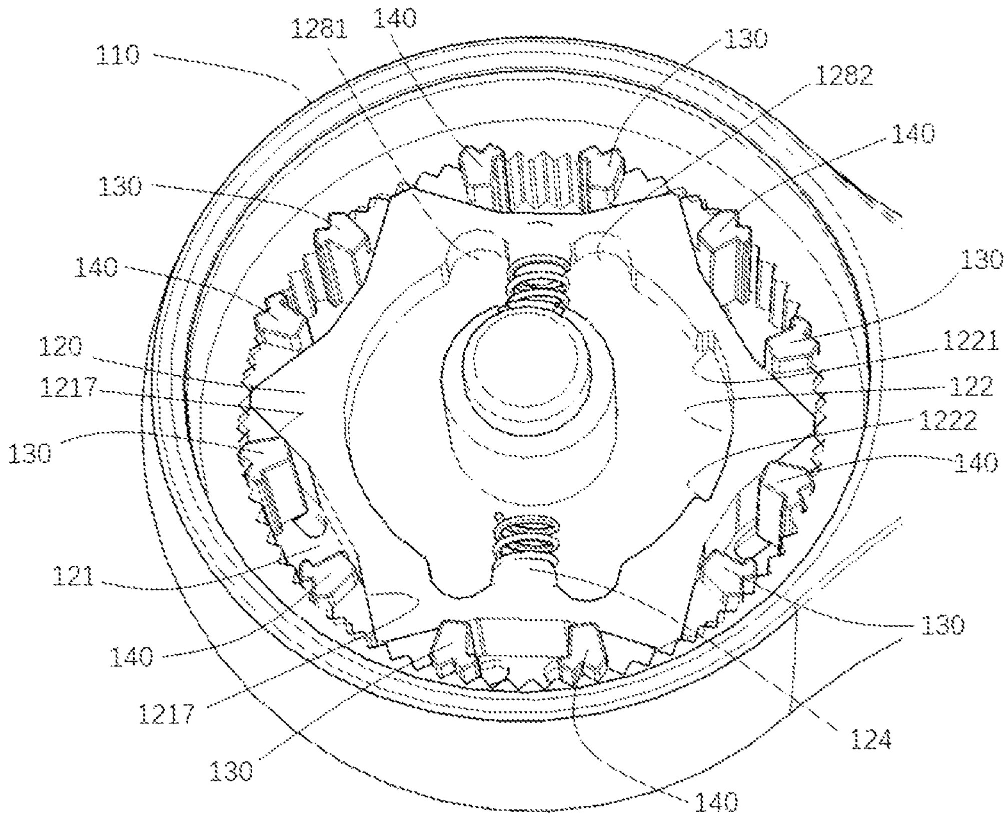
FIG. 12 is a schematic diagram showing the structure of Example 3 of the present application.

As shown in FIG. 12, compared with Examples 1 and 2, this Example expands the number of drive transmission members to 12. Six of them serve as first drive transmission members 130, and the remaining six as second drive transmission members 140.

The second member 120 has an axially-extending side wall defining 6 receiving recesses 121, in which the drive transmission members are received. In each receiving recess 121, one of the first drive transmission members 130 and one of the second drive transmission members 140 are received so as to be located at opposing ends of the specific receiving recess 121. Side faces 1217 of the receiving recesses 121 in contact with the drive transmission members are inclined.

Figure 13:
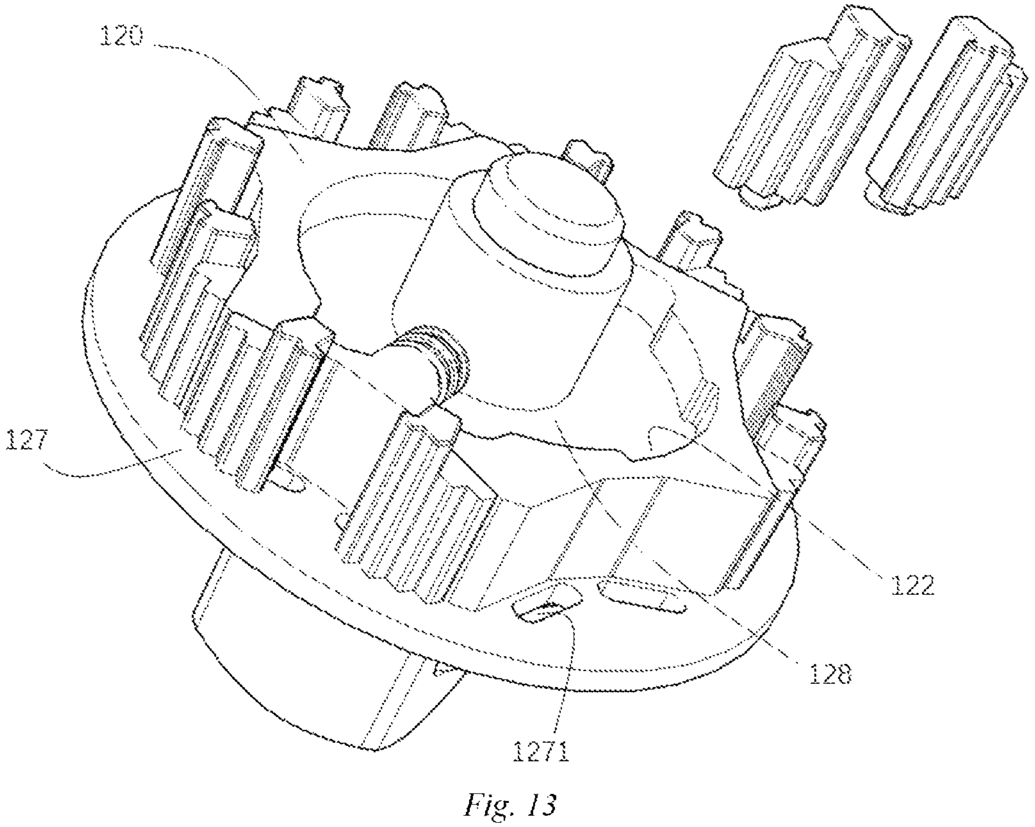
FIG. 13 is a schematic diagram showing the structure of a second member in Example 3 of the present application.

As shown in FIG. 13, the second member 120 is further provided, at its axial end, with an annular support 127, which may be integrally formed with the second member 120, or provided as a separate component fixed to the second member 120. The annular support 127 defines through slots 1271 in positional correspondence with the respective drive transmission members. The drive transmission members are inserted at one end in the through slots 1271 so as to able to slide in lengthwise directions of the through slots 1271. The lengthwise directions of each through slot 1271 is defined to be inclined with respect to a radial direction at an angle, which is substantially equal to that of a respective inclined face of the receiving recess 121. Each inclined face and the respective through slot 1271 are included at a different angle, allowing the drive transmission members to have different lead angles and hence different engagement configurations with the teeth of the first member 110. The concept of engagement configurations is the same as in Example 1. That is, one of the first drive transmission members 130 is full engaged, and both the remaining first drive transmission members 130 are partially engaged but over different contact areas. This also applies to the second drive transmission members 140.

It will be appreciated that the structure of the second member 120 for supporting the drive transmission members in this Example can be extended to Examples 1 and 2 after the numbers of the receiving recesses 121 and through slots 1271 are correspondingly reduced.

The switching assembly 150 in this Example is also structured differently from those in Examples 1 and 2.

Figure 14:
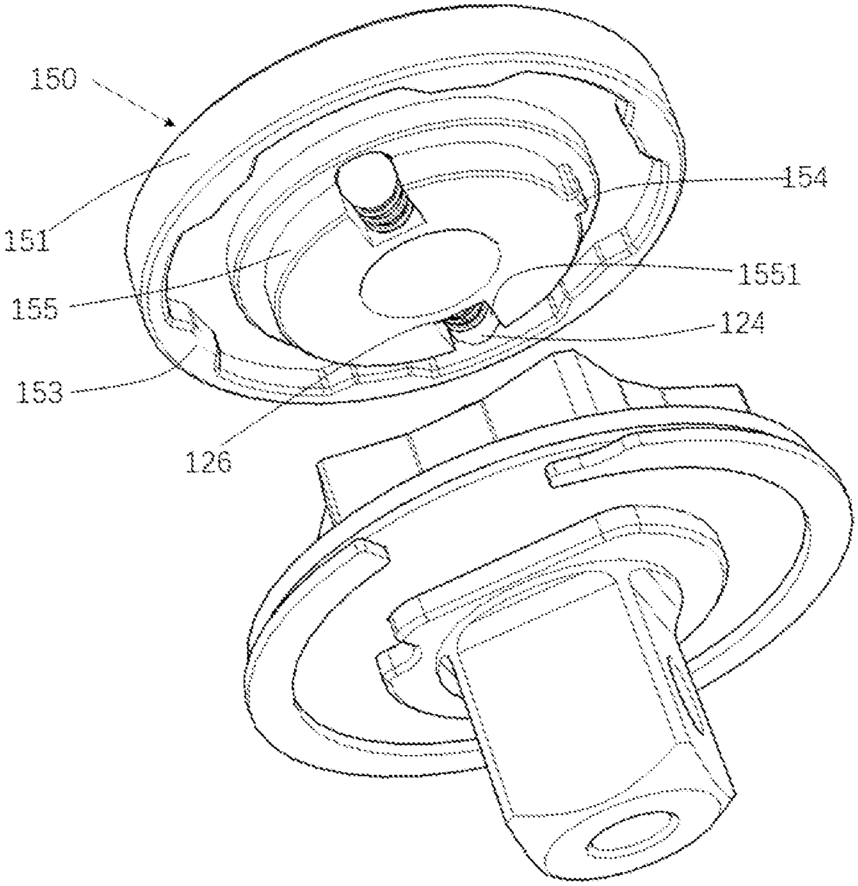
FIG. 14 is a schematic exploded view of an end cap and a second structure in Example 3 of the present application.
Figure 15:
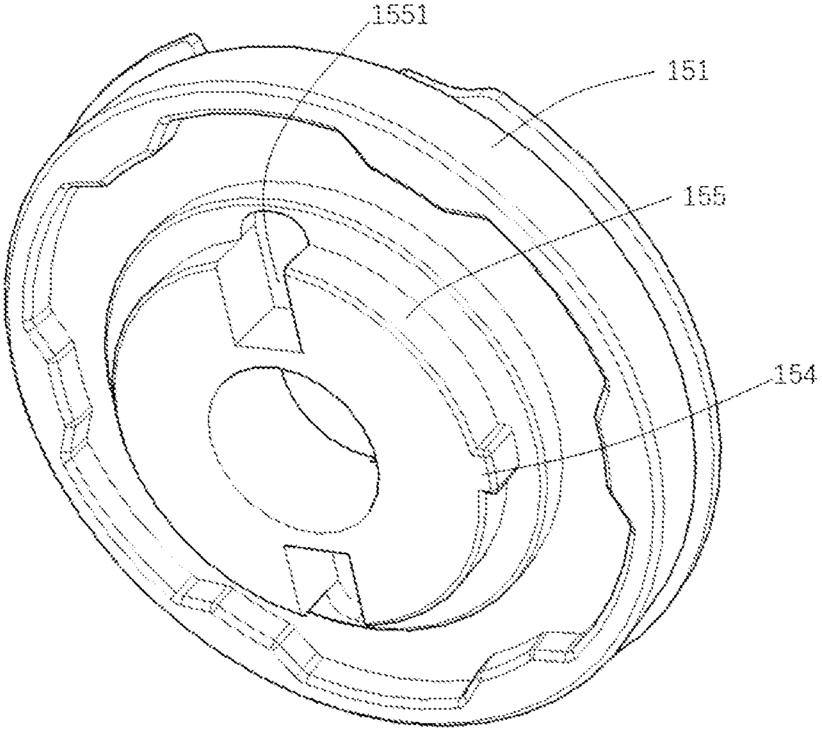
FIG. 15 is a schematic diagram showing the structure of the end cap in Example 3 of the present application.

As shown in FIGS. 14 and 15, the switching assembly 150 comprises an end cap 151 including stop blocks 153, which are structured and function in the same way as in Example 1, except that the number of stop blocks 153 is the same as that of drive transmission members in this Example, i.e., 6. A circular boss 155 is provided on a side face 1217 of the end cap 151 facing the second member 120, and the second member 120 defines a corresponding circular recess 128. When the end cap 151 is deployed at the end of the second member 120, the circular boss 155 is located within the circular recess 128, and as a result of the end cap 151 being rotated, the circular boss 155 can rotate within the circular recess 128. A stopper 154 radially projects outward from a side wall of the circular boss 155 on the end cap 151, and a stop recess 122 is radially recessed into a circumferential side wall of the circular recess 128. When the circular boss 155 rotates, the stopper 154 slides within the stop recess 122. When reaching either of two ends of the stop recess 122, the stopper 154 is stopped by the end of the stop recess 122, preventing further movement of the end cap 151. This entails rotational stroke control over the end cap 151.

As shown in FIG. 13, the circular recess 128 defines a first pocket 1281 and a second pocket 1282 in its circumferential side wall. As shown in FIG. 15, the circular boss 155 defines a transverse channel 1551 having an opening in a circumferential side wall of the circular boss 155. A locking ball 124 is provided in the transverse channel 1551, and a resilient element 126 is provided between the locking ball 124 and a side wall of the transverse channel 1551. When the circular boss 155 is rotated to a first position, the opening of the transverse channel 1551 is brought into communication with the first pocket 1281, and the locking ball 124 enters the first pocket 1281 under the action of the resilient element 126, thereby locking the end cap 151 at the first position. When the circular boss 155 is rotated to a second position, the opening of the transverse channel 1551 is brought into communication with the second pocket 1282, and the locking ball 124 enters the second pocket 1282 under the action of the resilient element 126, thereby locking the end cap 151 at the second position. When the opening of the transverse channel 1551 is aligned with a portion joining the first pocket 1281 and the second pocket 1282 (referring to FIG. 12), the locking ball remains in the transverse channel 1551. At this point, the end cap 151 is located at a third position.

The first pocket 1281, the second pocket 1282, the locking ball and the transverse channel 1551 may be considered as one set, and two such sets may be provided as illustrated, to provide increased locking strength.

It will be appreciated that the switching assembly of this Example is also applicable to Examples 1 and 2.

Compared with Examples 1 and 2, this Example expands the number of drive transmission members and provides more gear positions.

Example 4

Figure 16:
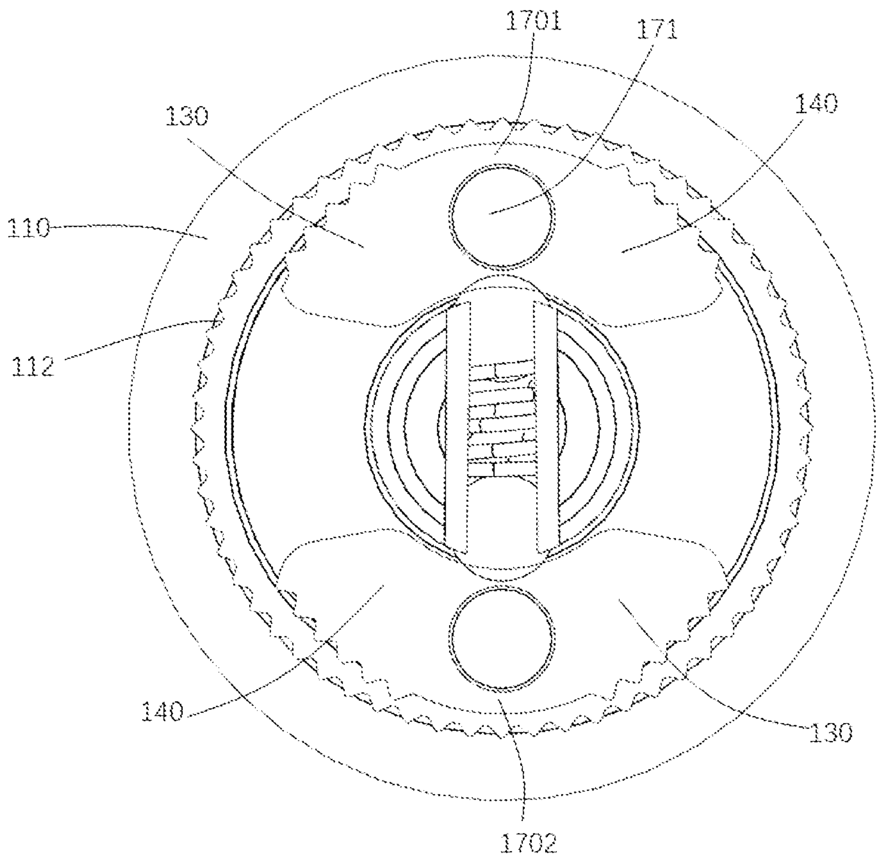
FIG. 16 is a schematic diagram showing the structure of Example 4 of the present application.
Figure 17:
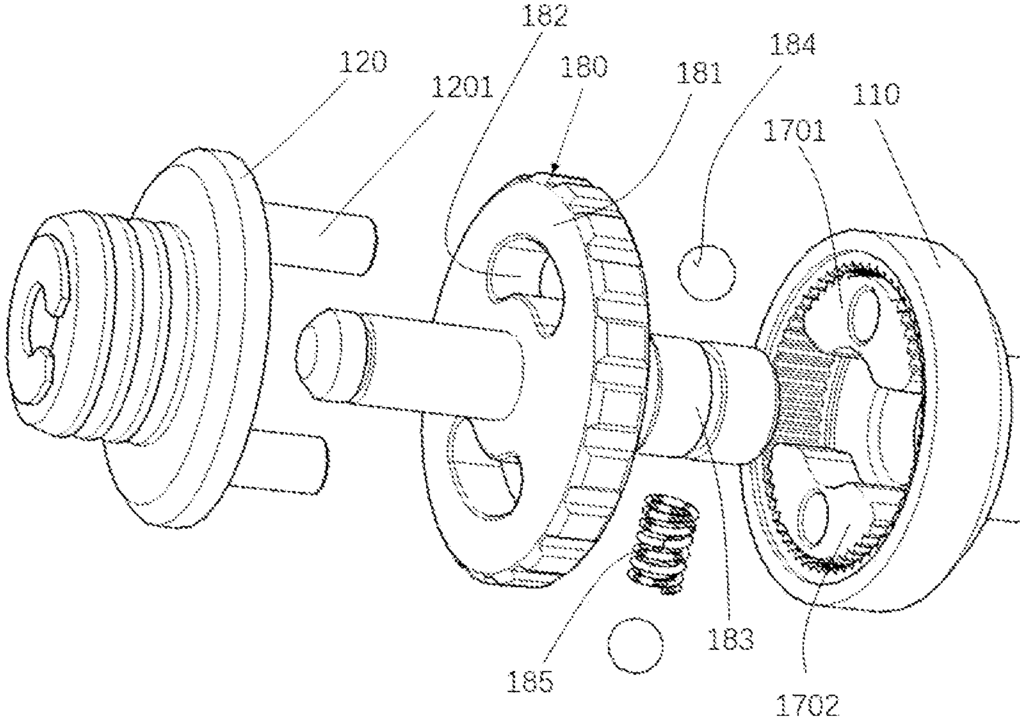
FIG. 17 is a schematic exploded view of Example 4 of the present application.
Figure 18:
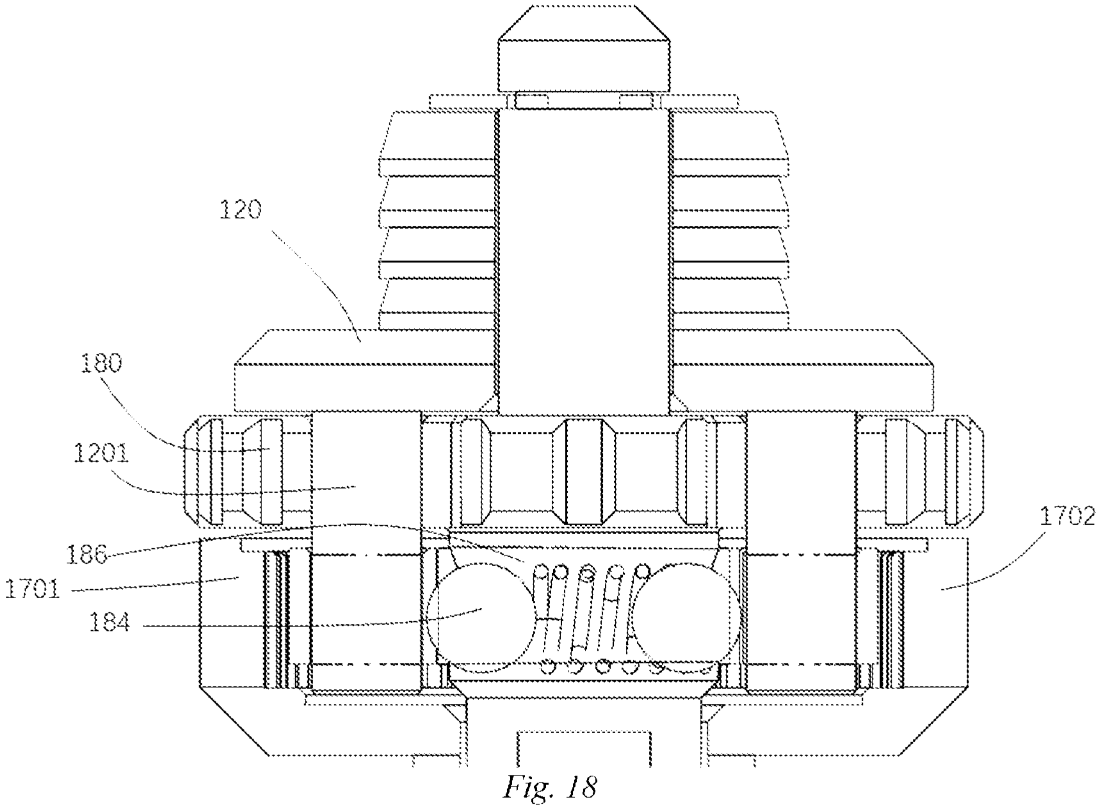
FIG. 18 is a cutaway view of Example 4 of the present application.

FIGS. 16 to 18 show the structure of Example 4.

This Example differs from Example 1 in including a reduced number of drive transmission members.

As shown in FIG. 16, this Example includes 2 first drive transmission members 130 and 2 second drive transmission members 140. It will be appreciated that the 4 drive transmission members may be of the same structure as, but are fewer than, those in Examples 1, 2 and 3. Alternatively, they may be structured as described in this Example. In this way, different types of manual tools can be accommodated.

As shown in FIG. 16, each of the first drive transmission members 130 is integrated with one of the second drive transmission members 140 to form a sectorial component with ratchet teeth at its opposite ends. That is, the single sectorial component functions as both the first drive transmission member 130 and the second drive transmission member 140. The two sectorial components, i.e., a first sectorial component 1701 and a second sectorial component 1702, both define through holes 171, and the second member 120 is provided at corresponding locations thereof with posts 1201 passed through the through holes 171.

The ratchet mechanism of this Example further includes a support member 180. The support member 180 includes an annular portion 181 defining therein two arcuate through slots 182 corresponding to the respective posts 1201. The posts 1201 are passed through the arcuate slots 182 into the through holes 171 in the sectorial components 1701, 1702. A shaft 183 projects from a side face of the annular portion 181 towards the first member 110 and is located between the two sectorial components 1701, 1702. The shaft 183 defines a stop aperture 186 radially extending therethrough and defining two opposing openings. One opening faces the first sectorial component 1701, and the other opening faces the second sectorial component 1702. Two spherical elements 184 are disposed in the stop aperture 186, and there is a spring 185 between the two spherical elements 184. Under the action of the spring 185, the two spherical elements 184 are in contact respectively with the first sectorial component 1701 and the second sectorial component 1702.

Rotating the annular portion 181 can bring the one spherical element 184 into contact with the first drive transmission member 130 in the first sectorial component 1701 and the other spherical element 184 with the first drive transmission member 130 in the second sectorial component 1702. Under the effect of the abutment of the spherical elements 184, the two sectorial components 1701, 1702 are each rotated by a slight angle so that the first drive transmission members 130 are engaged with the teeth 112 of the first member 110 and the second drive transmission members 140 are disengaged from the teeth 112 of the first member 110. Rotating the annular portion 181 in the opposite direction can swap the first drive transmission members 130 and the second drive transmission members 140 between the engagement configurations.

In this Example, the first drive transmission members 130 may assume either of full and partial engagement configurations with the teeth 112 of the first member 110, and so may the second drive transmission members 140. Contact surfaces of the sectorial component portions functioning as the first and second drive transmission members with the spherical elements may be inclined at different angles with respect to radial directions to achieve the different engagement configurations.

Example 5

FIGS. 19 to 23 show the structure of Example 5.

In each of Examples 1 to 4, the teeth of the first member are provided on its inner circumferential peripheral surface. In this Example, the teeth of the first member are provided on its outer circumferential peripheral surface.

Figure 20:
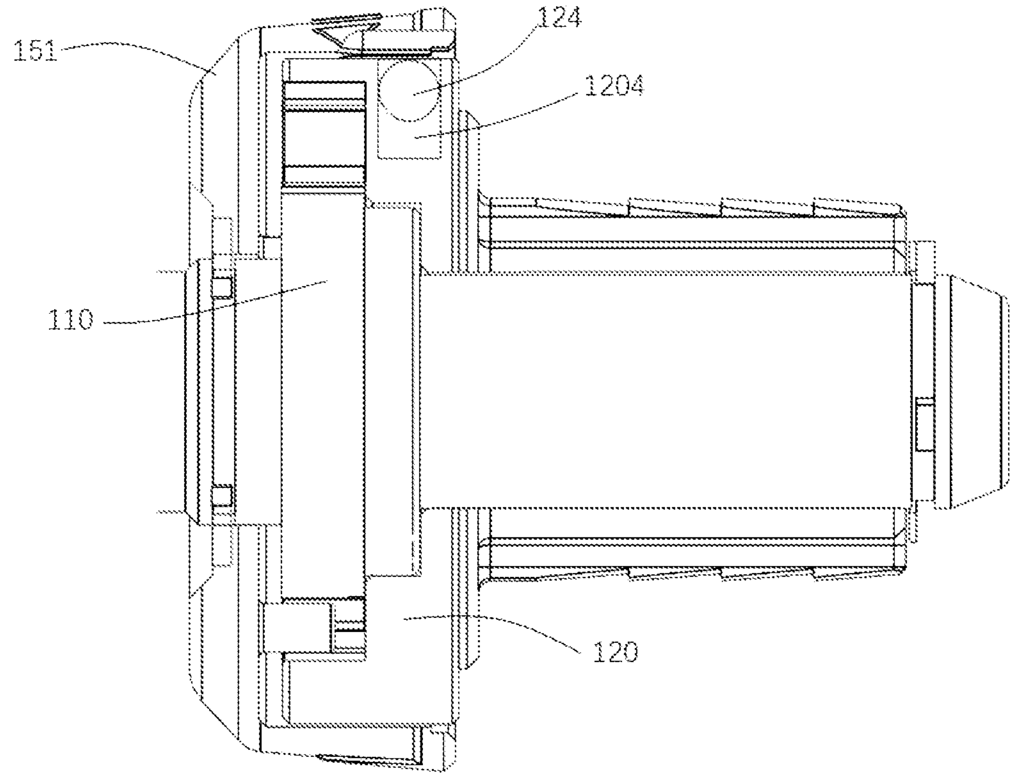
FIG. 20 is a schematic diagram showing the internal structure of Example 5 of the present application.
Figure 21:
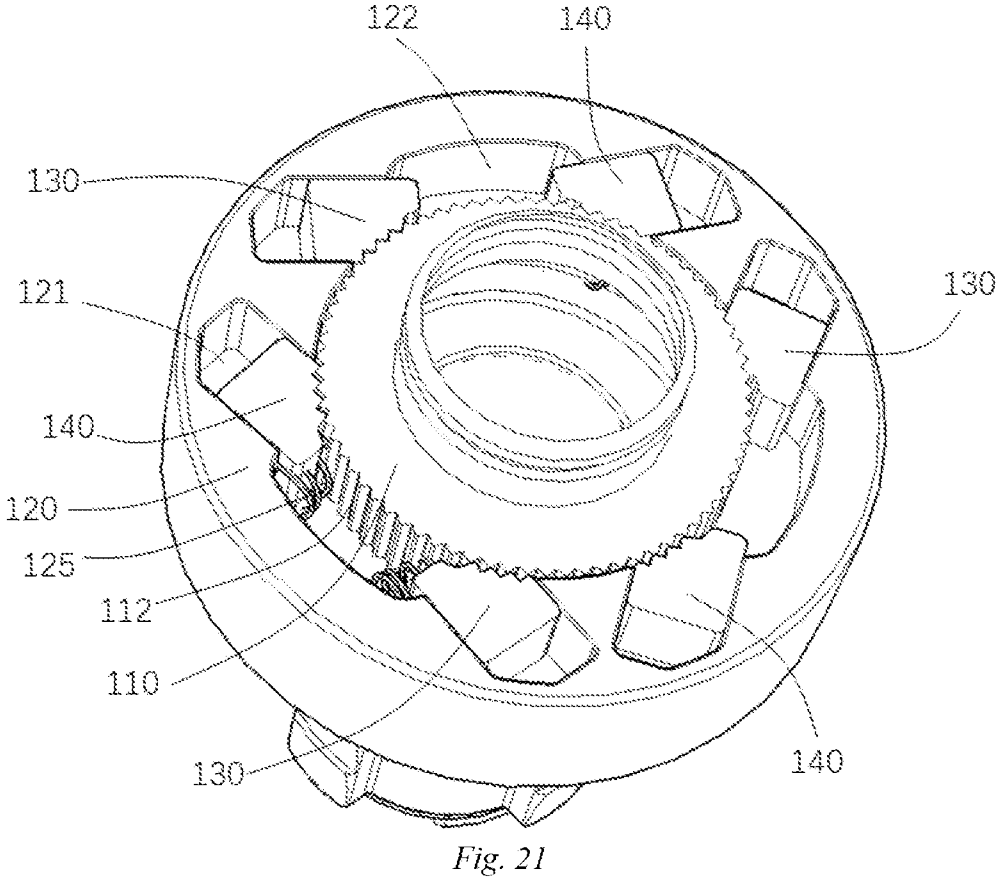
FIG. 21 is a schematic diagram showing how drive transmission members, a first member and a second member are coupled together in Example 5 of the present application.
Figure 22:
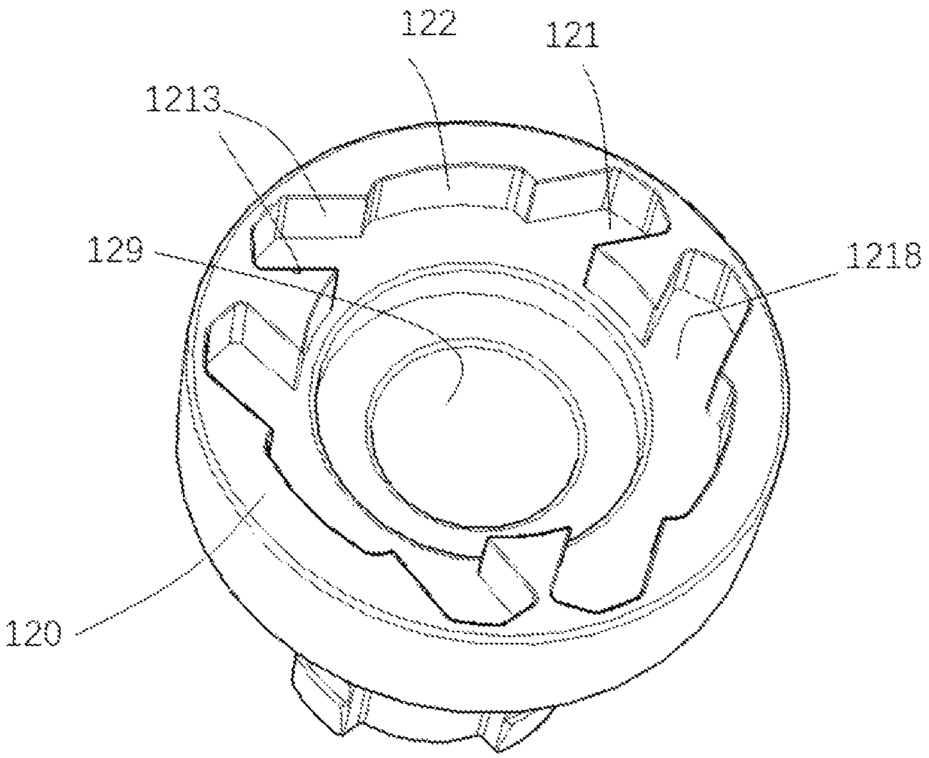
FIG. 22 is a schematic diagram showing the structure of the second member in Example 5 of the present application.

As shown in FIGS. 20, 21 and 22, an end portion of the second member 120 defines a substantially annular cavity 129, and a plurality of axially-extending teeth 112 are defined on the outer circumferential peripheral surface of the first member 110. The portion of the first member 110 defining the teeth 112 is located within the cavity 129. A plurality of receiving recesses 121 are defined on a side wall of the cavity 129 and have openings 1218 facing toward the teeth 112 of the first member 110. Each receiving recess 121 is provided therein with a drive transmission member. Ratchet teeth of the drive transmission members are passed through the openings 1218 of the receiving recesses and engage the teeth 112 of the first member 110.

In this Example, 3 first drive transmission members 130, 3 second drive transmission members 140 and 6 receiving recesses 121 are provided. The first drive transmission members 130 alternate with the second drive transmission members 140.

A contact surface 1213 of each receiving recess 121 with the respective drive transmission member is inclined at a different angle with respect to a radial direction, allowing the drive transmission members to engage the teeth 112 of the first member 110 in different engagement configurations. This is accomplished in the same manner as in Example 1, and further description thereof is omitted herein for the sake of brevity.

Figure 19:
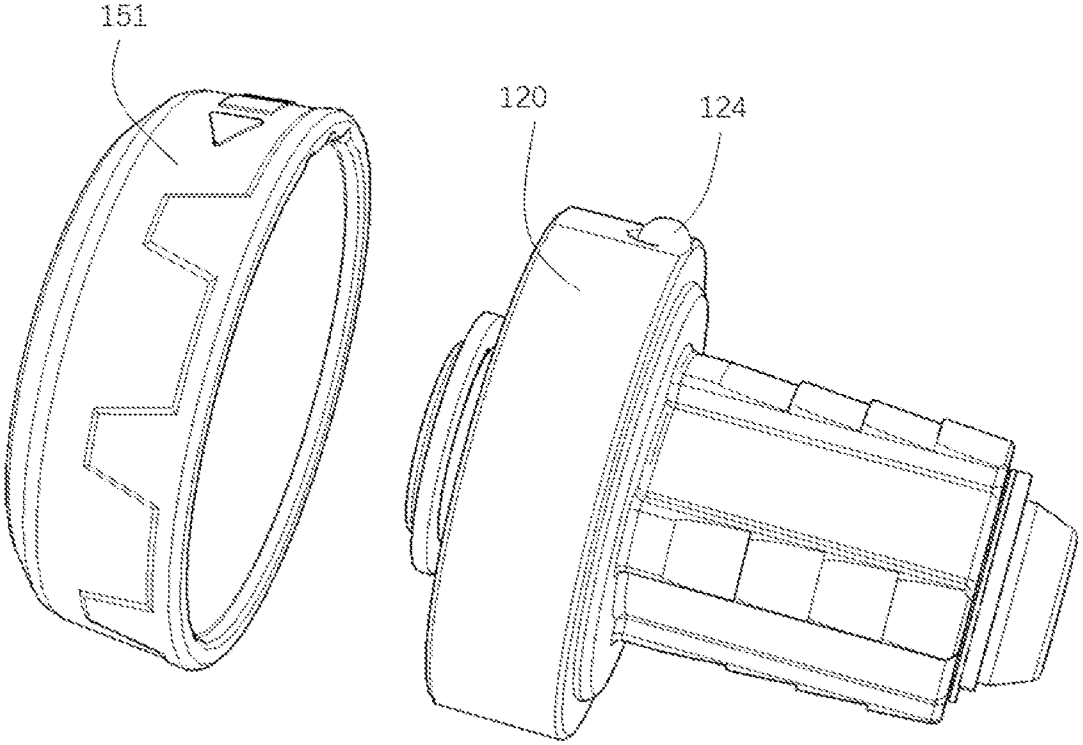
FIG. 19 is a schematic exploded view of Example 5 of the present application.
Figure 23:
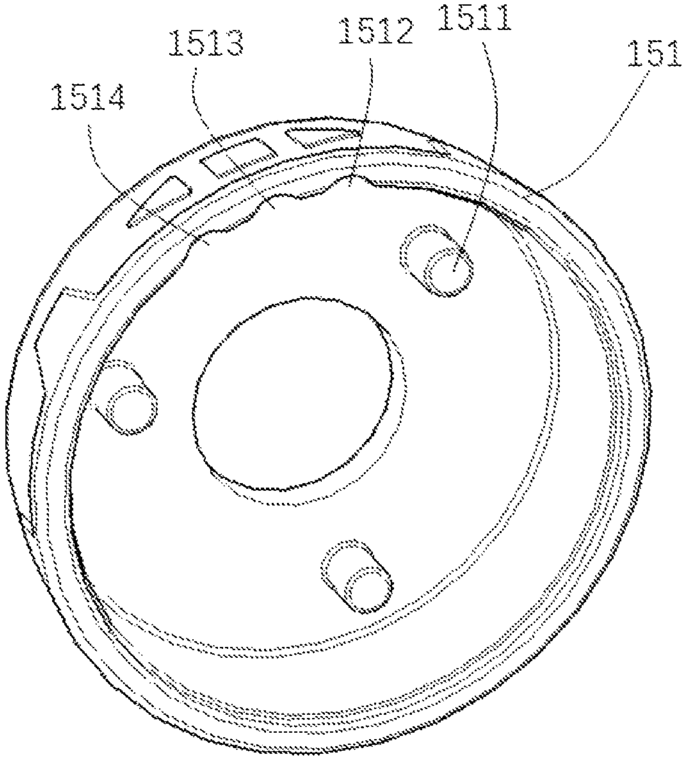
FIG. 23 is a schematic diagram showing the structure of an end cap in Example 5 of the present application.

As shown in FIGS. 19, 20 and 23, the switching assembly includes an end cap 151 fitted over the second member 120. Stop posts 1511 are provided on a surface of the end cap 151 facing the receiving recesses 121, and a plurality of stop recesses 122 for cooperating with the stop posts 1511 are defined in the side wall of the cavity 129. Each stop recess 122 is located between adjacent two of the receiving recesses 121. The stop posts 1511 extend into the stop recesses 122. When the end cap 151 is rotated, the stop posts 1511 can slide within the stop recesses 122. When engaged with the teeth 112, the drive transmission members 130, 140 are at least partially located within the stop recesses 122. When reaching ends of the stop recesses 122, the stop posts 1511 can come into contact with the drive transmission members 130, 140 and thereby drive the corresponding drive transmission members 130, 140 to disengage from the teeth 112.

The second member 120 defines a hole 1204 in its side wall facing the end cap 151, and a locking ball 124 is disposed in the hole 1204. The end cap 151 defines, in its portion aligned with the through hole, a first pocket 1512, a second pocket 1513 and a third pocket 1514, which are arranged in tandem. Rotating the end cap 151 can align the different pockets with the through hole, and the locking ball will be urged into the aligned pocket, locking the end cap in position. For example, when the locking ball 124 is located in the first pocket 1512, the stop posts 1511 may contact the first drive transmission members 130 and disengage them from the teeth 112, making them unable to transmit movement, i.e., in a non-working state. When the locking ball 124 is located in the third pocket 1514, the stop posts 1511 may contact the second drive transmission members 140 and disengage them from the teeth 112, making them unable to transmit movement, i.e., in a non-working state. When the locking ball 124 is located in the second pocket 1513, the stop posts 1511 may contact neither of the first and second drive transmission members. A second resilient element (not shown) is disposed between the locking ball 124 and the hole 1204.

The drive transmission members are coupled to first resilient elements 125 within the receiving recesses 121, which can restore the position of the drive transmission members.

As noted above, in the ratchet mechanism of the present application that has been described above with reference to Examples above, through configuring the drive transmission members in different engagement configurations with the teeth of the first member, more transmission gear positions can be provided without increasing the number of teeth, resulting in increased transmission efficiency, reduced fluctuations, sufficient strength, reduced resistance to reverse ratcheting and less tear and wear. Moreover, the switching assembly makes the ratchet mechanism bidirectionally operable, with more gear positions being provided in both directions. It will be appreciated that the ratchet mechanism is not limited to the variations described in the foregoing embodiments, and one of ordinary skill in the art can make many modifications and alternations without exerting any creative effort in light of the teachings disclosed herein. Therefore, it is intended that all these modifications and alternations are within the scope of the present application as defined by the appended claims.

II. Ratchet Wrench

In Section I, the ratchet mechanism of this application is described. In this Section, use of the ratchet mechanism in a wrench will be described.

Example 6

Figure 24:
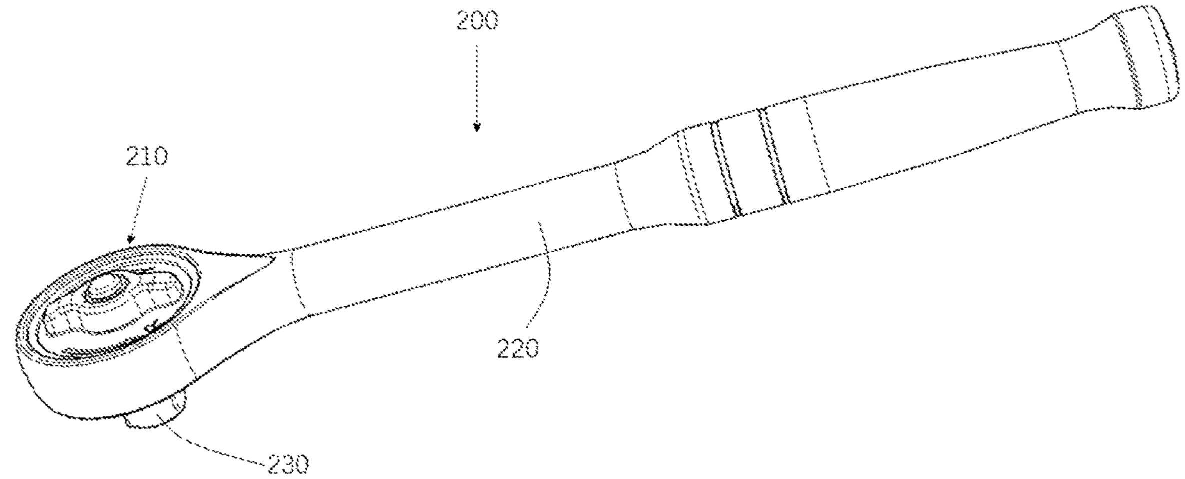
FIG. 24 is a schematic diagram showing the structure of a wrench according to Example 6 of the present application.
Figure 25:
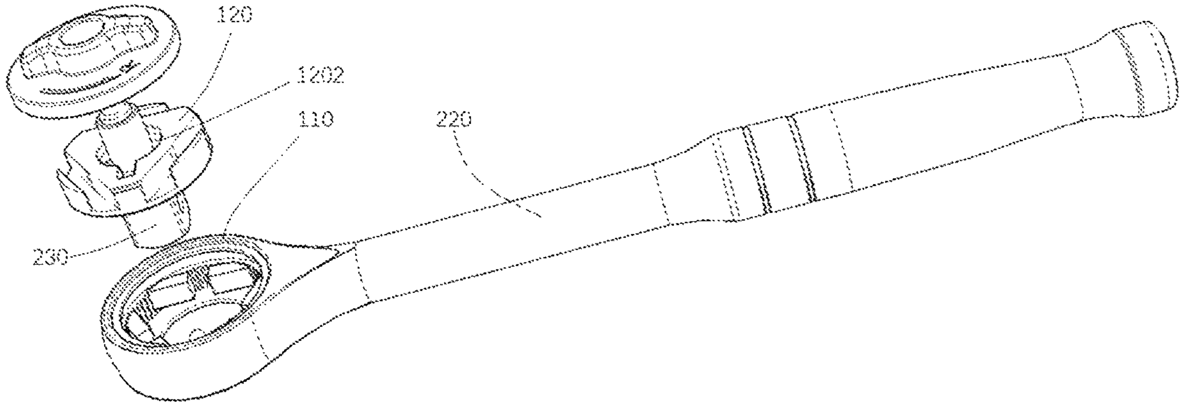
FIG. 25 is a schematic exploded view of the wrench in Example 6 of the present application.

As shown in FIGS. 24 and 25, the wrench 200 includes a handle 220 provided at its one end with a corresponding wrench head 210, in which the ratchet mechanism of any of Examples 1 to 4 is disposed. The first member 110 of the ratchet mechanism may be integrally formed with the handle 220. In the illustrated example, the wrench head 210 is provided with an output end 230, which may be coupled to various sleeves. The output end 230 is coupled in a central aperture 1202 in the second member 120 of the ratchet mechanism so as to rotate with the second member 120. When operating the handle 220, a user may exert a torque on the handle 220 to drive rotation of the first member 110. This movement can be communicated to the second member 120 by the drive transmission members, causing the output end 230 to rotate therewith. In this way, output of the torque can be achieved. When the user pivots the handle 220 in the opposite direction, reverse ratcheting of the ratchet mechanism will occur. The second member 120 will not be rotated, allowing the user to restore his/her hand position. In this way, a fastener can be turned in a continuous manner within a limited space.

It will be appreciated that the wrench head 210 may alternatively be configured in an open form. That is, the central aperture 1202 of the second member 120 may be configured as a polygonal through bore, which can directly cooperate with a fastener and can receive a nut or a head portion of a fastener to enable the wrench to apply a torque to the nut or the head portion of the fastener. Still alternatively, wrench heads 210 may be provided at opposite ends of the handle 220.

Example 7

FIGS. 26 to 36 show Example 7. In this Example, a ratchet wrench differing from that of Example 6 is described.

Figure 26:
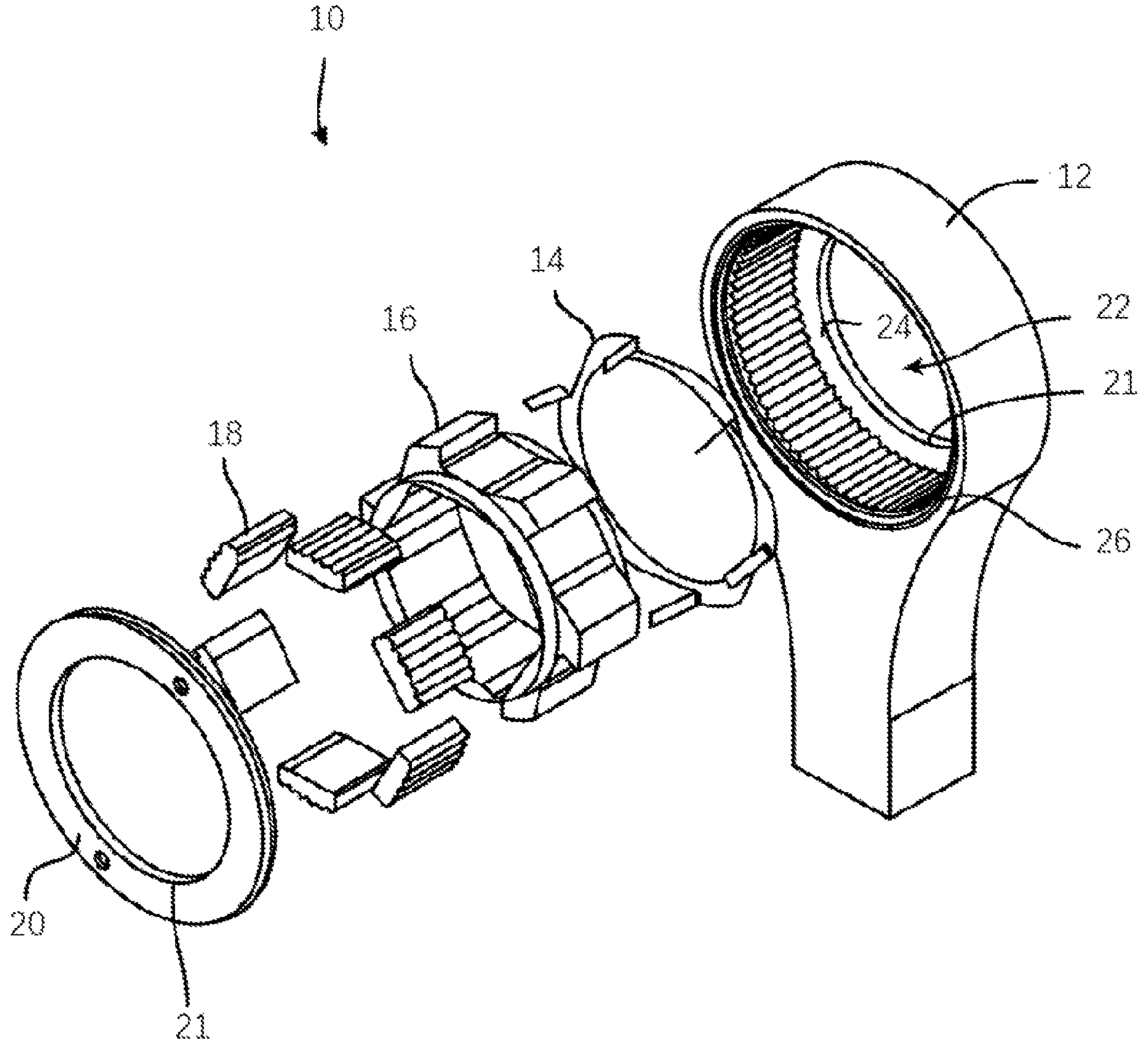
FIG. 26 is a schematic exploded view of a wrench according to Example 7 of the present application.
Figure 27:
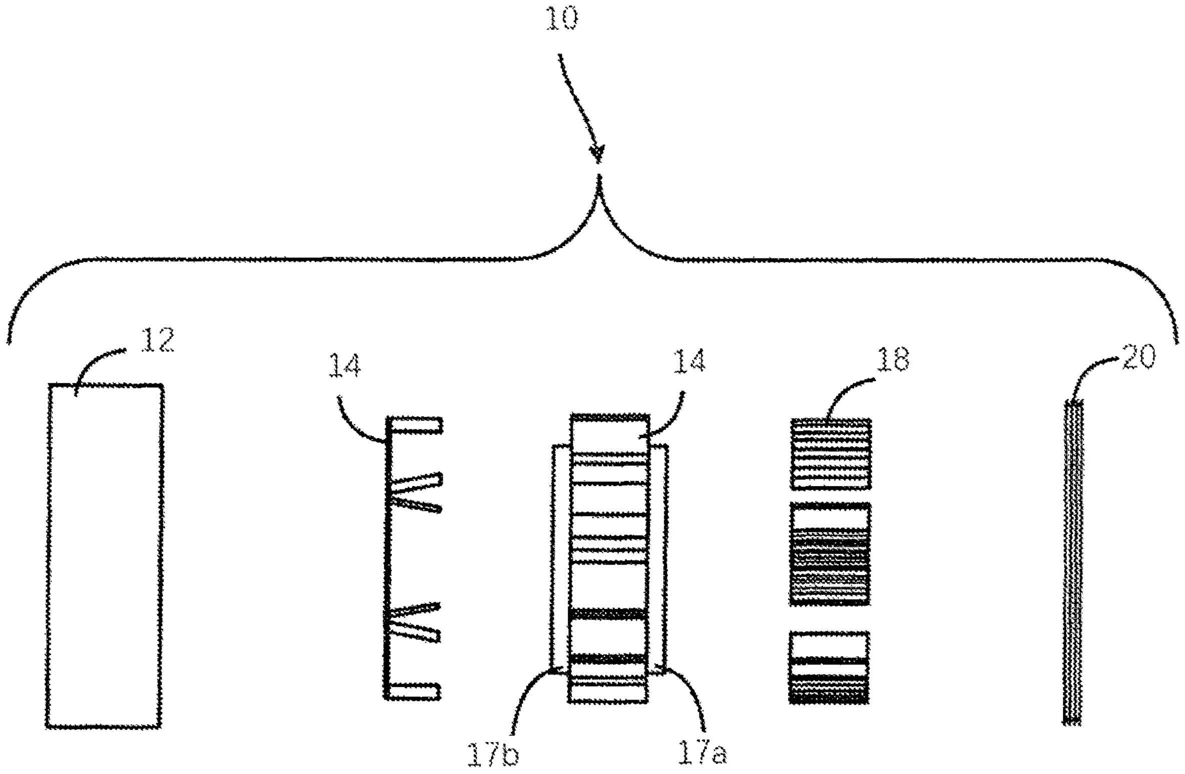
FIG. 27 is an exploded top view of a ratchet of FIG. 26.
Figure 28:
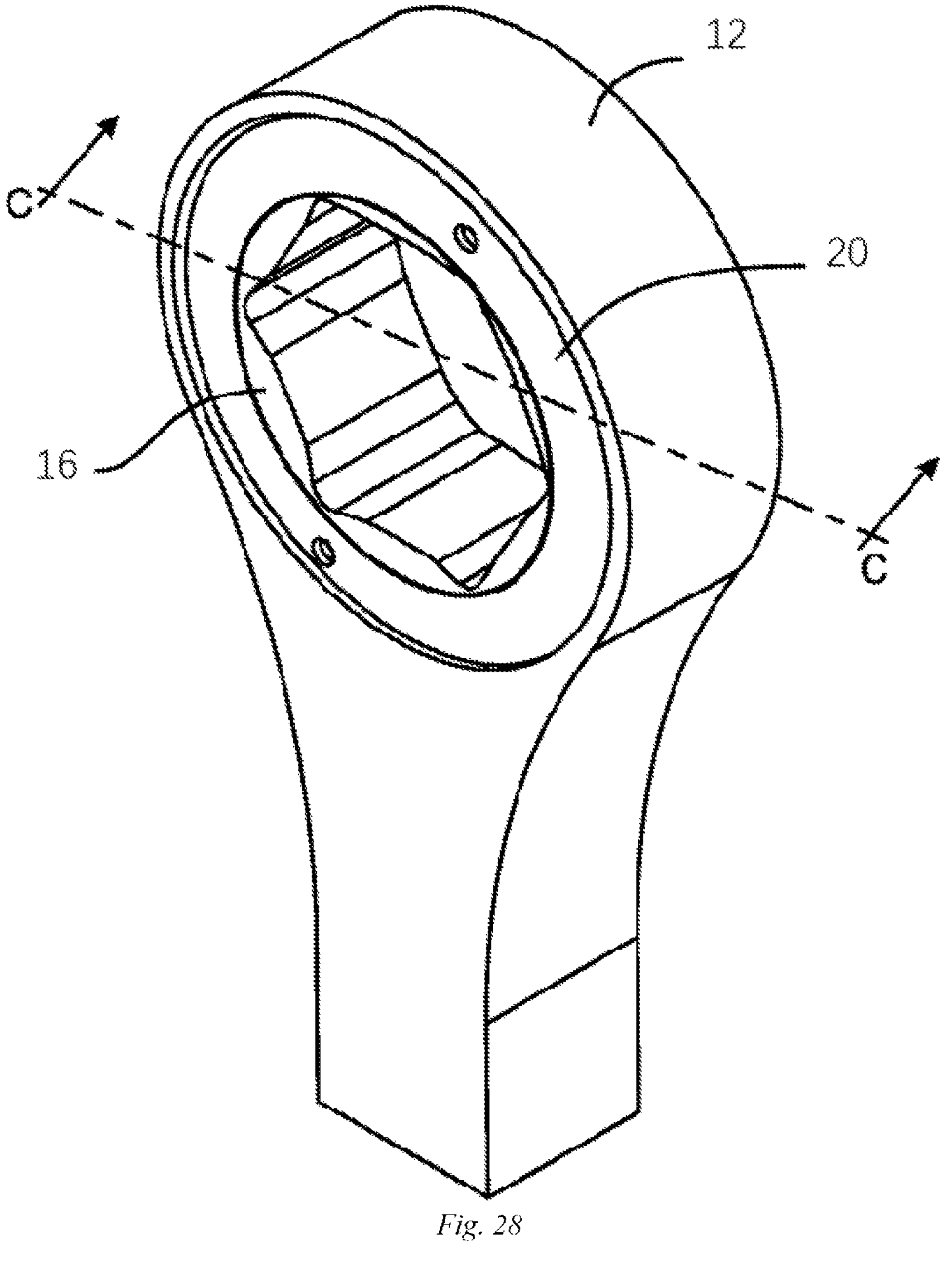
FIG. 28 is a perspective view of the assembled ratchet of FIG. 26.

Referring now to FIGS. 26 and 27, an example of a ratchet wrench 10 formed in accordance with the teachings of the present invention is illustrated, which includes a handle 12 provided at its one end with a corresponding wrench head. In some embodiments, the ratchet mechanism of any of Examples 1 to 4 is disposed in the wrench head. In some embodiments, the illustrated ratchet mechanism is disposed in the wrench head. The ratchet mechanism used in Example 7 is described in detail with reference to the accompanying drawings.

In this example, the ratchet wrench 10 comprises a handle 12, a spring ring 14, a wheel 16, a plurality of pawls 18, and a cap 20.

As illustrated, one end of the handle 12 defines a cavity 22 to rotatably hold the spring ring 14, the wheel 16, and the pawls 18 as illustrated in FIG. 27. In this example, one side of the cavity 22 is integrally formed with a wall or flange 24 to at least partially enclose the one side of the cavity 22. Meanwhile, the other side of the cavity 22 is adapted to removably receive the cap 20, which is configured to be mounted over the cavity 22 and to at least partially enclose the other side of the cavity 22. In this example, the cap 20 is threaded to removably engage corresponding threads formed in the inner wall of the cavity 22. It will be appreciated by one of ordinary skill in the art that each of the flange 24 and the cap 20 may be integrally or separately formed as desired, and may be mounted to the handle 12 via any suitable mechanism, including for instance, fasteners, adhesives, solders, etc. Together, the flange 24 and the cap 20, once mounted to the handle 12, cooperate to retain the spring ring 14, the wheel 16, and the pawls 18 within the cavity 22. In addition, the flange 24 and the cap 20 each define an aperture 21 to allow operable access to the elements retained within the cavity 22.

A plurality of teeth 26 are formed longitudinally on an inner periphery of the cavity 22. In this example, each tooth 26 has a substantially equilateral tooth profile. As will be appreciated, however, in some example, each tooth 26 may include an inclined face and a substantially upright face.

Figure 32:
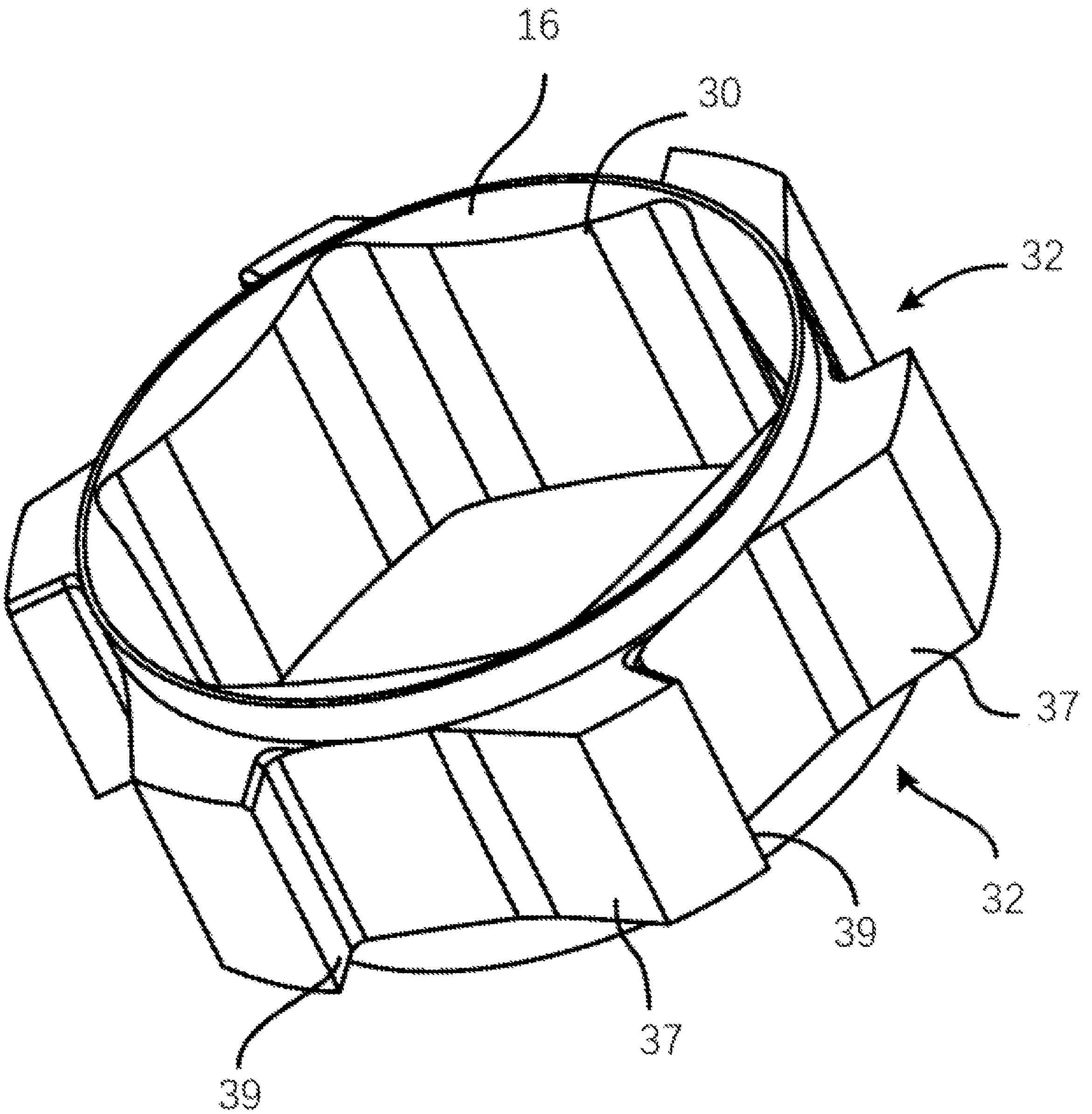
FIG. 32 is a perspective view of a wheel for use in the ratchet of FIG. 26.
Figure 33:
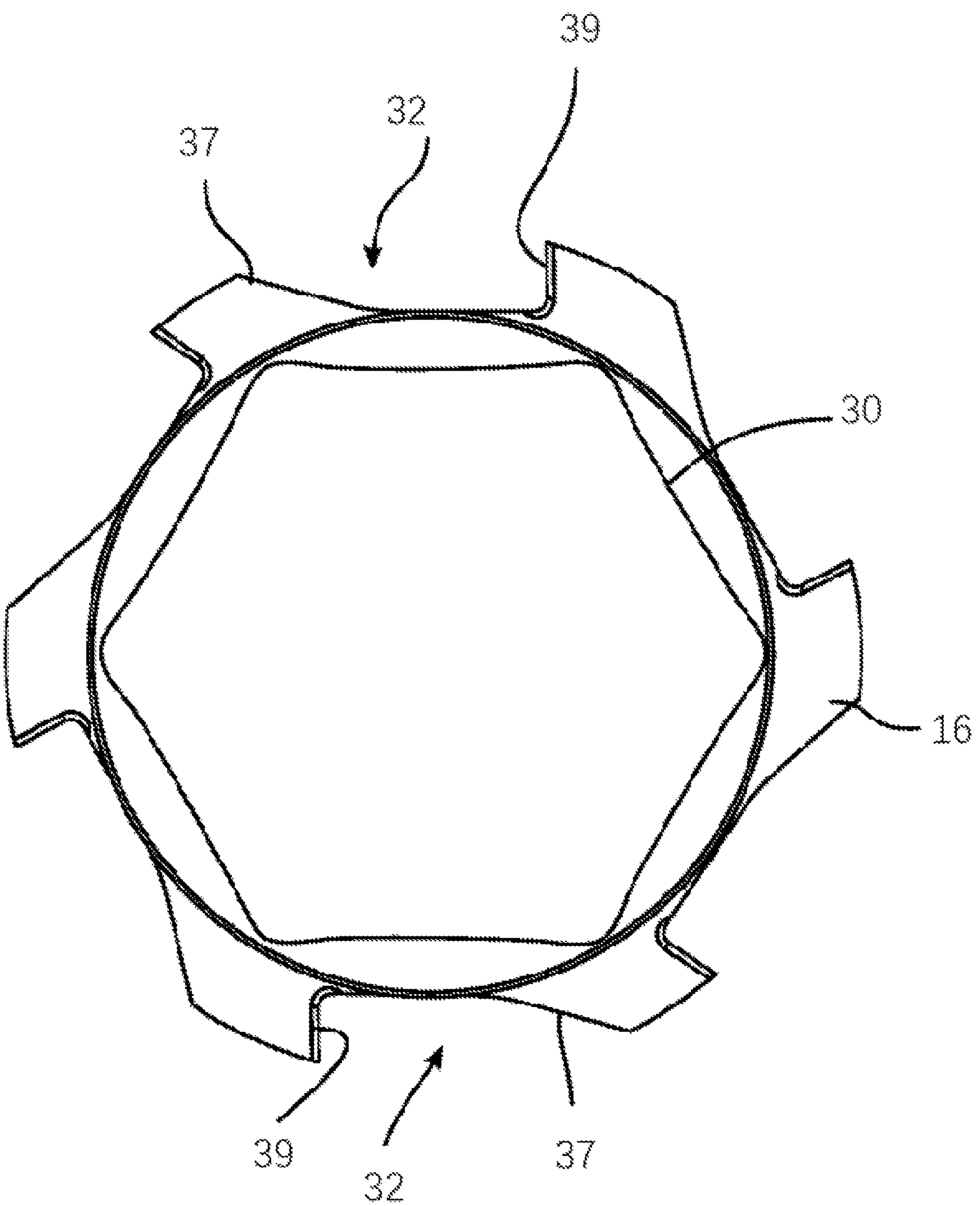
FIG. 33 is a top view of the wheel of FIG. 32.

As additionally illustrated in FIGS. 32-33, in this example, the wheel 16 includes a socket 30 defined in the center and adapted to engage a bolt, nut, fastener, or other similar fitting. In this instance, the example socket 30 is defined as a regular polygon, e.g., a hexagon, but it will be understood that the socket 30 may be any suitable shape and/or design. The example wheel 16 also defines arcuate flanges **17*a*, 17*b*, extending from each side of the wheel 16 and, in this example, sized to extend at least partially through the corresponding aperture defined by the flange 24 and the cap 20**.

At least one pawl recess 32 is longitudinally defined around the outer periphery of the wheel 16. As will be understood, in the illustrated example, the wheel 16 includes six evenly dispersed pawl recesses 32 around the outer periphery, but any suitable number of pawl recesses 32 may be utilized as desired. In addition, the spacing of the pawl recesses need not be evenly or symmetrically arranged around the outer periphery, but may be distributed as preferred.

The example pawl recesses 32 are each bordered by an inclined face 37 on one side and a generally upright face 39 that extends outward from the outer periphery of the wheel 16 on the other side. Similar to the teeth 26, in his example, all inclined faces 37 and the upright faces 39 of the teeth pawl recesses 32 are arranged in the same direction.

At least one pawl 18 is mounted within at least one corresponding pawl recess 32 in the wheel 16. As illustrated, in this example, each of the six pawl recesses 32 includes a corresponding pawl 18, and thus the ratchet 10 includes six pawls 18 distributed around the wheel 16.

In the example illustrated herein, the six pawls 18 are divided into three sets of two pawls, and each of the three sets is clocked differently by the wheel 16 such that when one set of pawls 18 is engaged with the teeth 26, one of the other sets of pawls 18 is only partially engaged (e.g., half engaged) and the remaining set of pawls is disengaged. By clocking the pawls differently, a coarser tooth pattern can be used while maintaining a fine tooth pattern action. It will be appreciated that the arrangement and number of sets, and the various clocking patterns associated with the pawls may vary with differing design arrangements.

Figure 34:
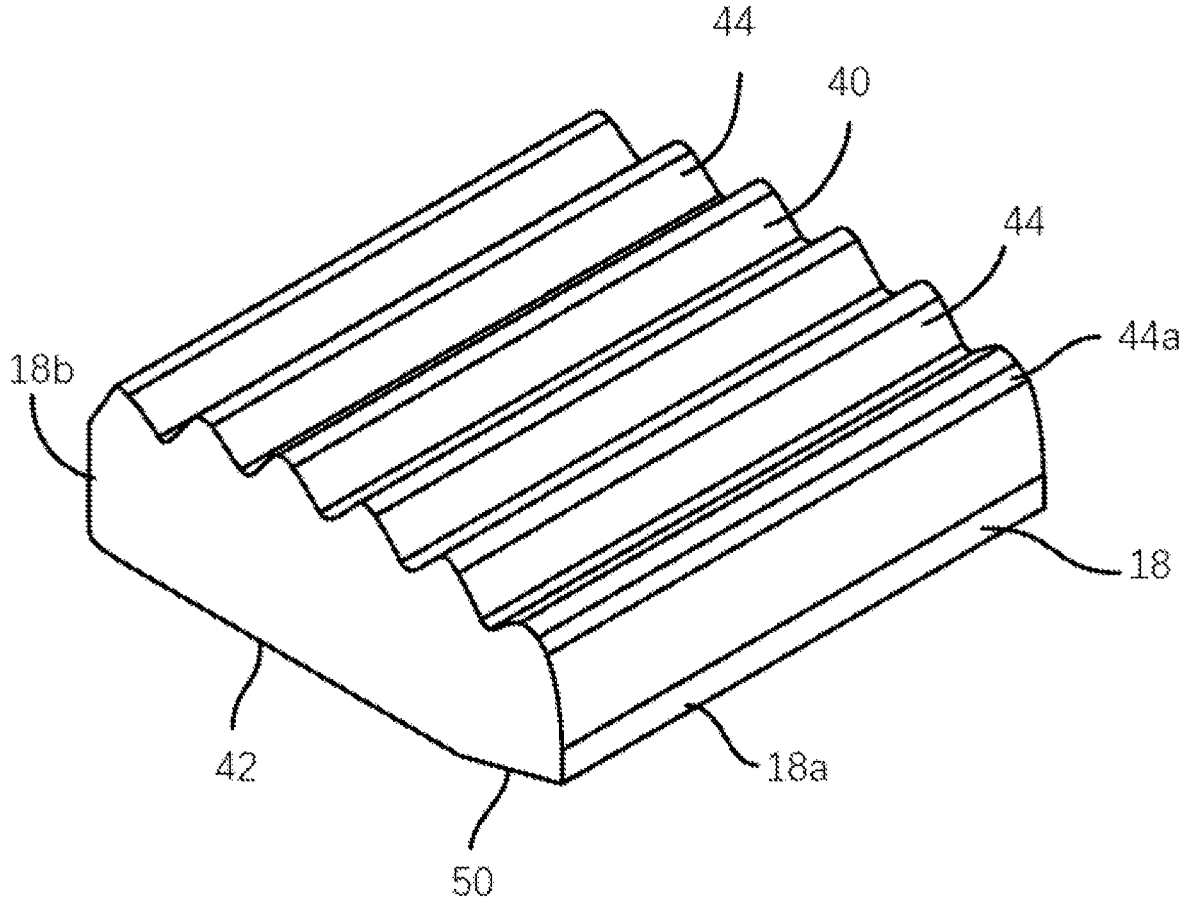
FIG. 34 is a perspective view of a pawl for use in the ratchet of FIG. 26.
Figure 35:
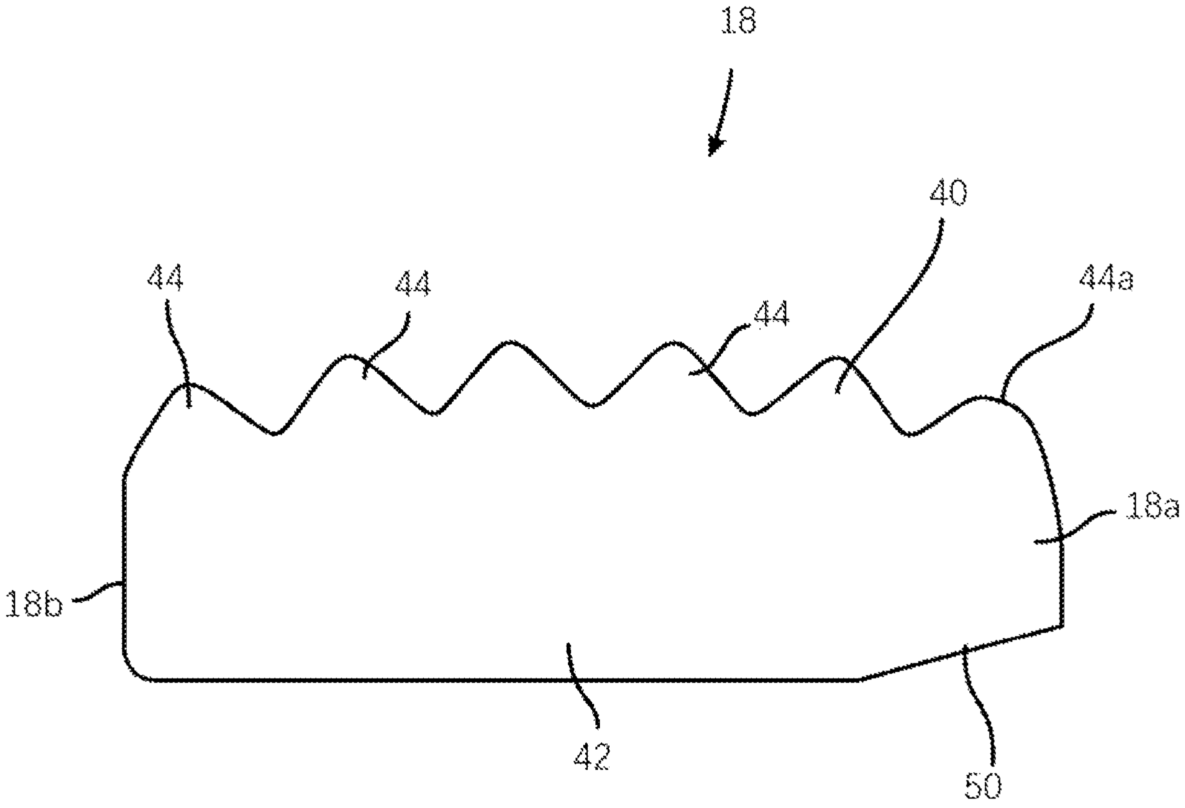
FIG. 35 is a top view of the pawl of FIG. 34.

As best seen in FIGS. 34 and 35, each of the example pawls 18 includes a toothed face 40 facing outward (e.g., away from the wheel 16 when assembled) and a substantially smooth face 42 facing inward (e.g., towards the wheel 16 when assembled). In this example, the toothed face 40 includes at least one tooth 44, such as for example, a plurality of teeth 44 to engage the teeth 26 formed on the inner periphery of the cavity 22 when both the pawls 18 and the wheel 16 are assembled within the cavity 22. In the illustrated example, each pawl includes five teeth 44 formed on the pawl 18, and a sixth tooth **44*a* formed on one end 18*a* of the pawl 18. It will be appreciated by one of ordinary skill in the art that the number and/or shape of the teeth 44, 44*a* may vary as desired, and while each of the teeth 44 may be generally similar, if not identical, in shape, the shape and/or position of the teeth 44** may vary to provide different effects, such as for instance, various clocking modes as appropriate.

In this example, as best illustrated in FIG. 35, the five teeth 44 are generally uniform in appearance and include a substantially triangular tooth profile. The sixth tooth **44*a* meanwhile includes a slightly more rounded tooth profile, which as will be described in detail herein, may better assist in allowing the pawl 18 to move relative to the inner periphery of the cavity 22 when the wheel 16 is rotated in the correct direction. In addition, to further assist the pawl 18 in movement relative to the inner periphery of the cavity 22, the smooth face 42 near the end 18*a* of the pawl 18 may include a cammed surface 50 for engagement with the corresponding inclined face 37 of the pawl recess 32. An opposite end 18*b* includes a generally flat surface. It will be understood, however, that the number, arrangement, and/or shape of any of the teeth 44 as well as the overall shape of the faces of the pawl 18** may vary as desired.

Figure 30:
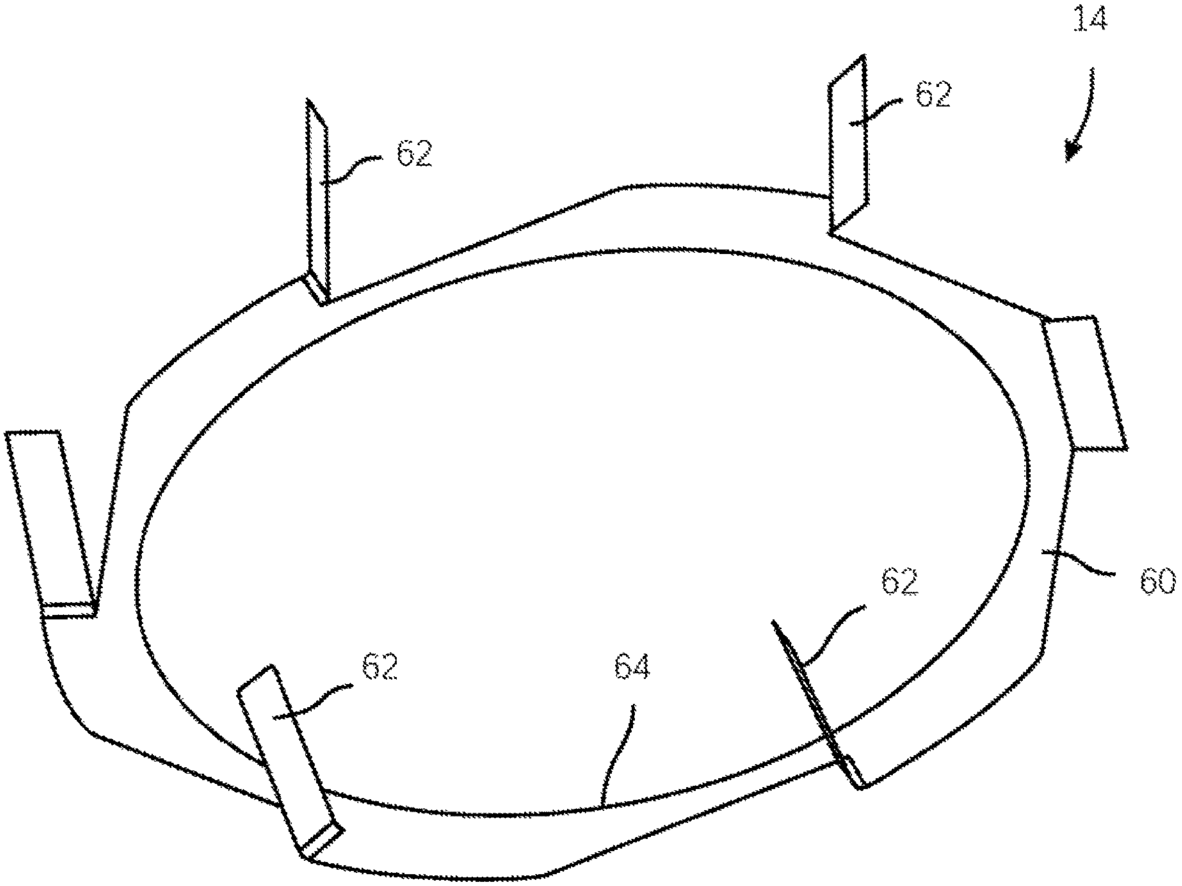
FIG. 30 is a perspective view of an example spring ring for use in a ratchet of FIG. 1.

As best illustrated in FIG. 30, the example spring ring 14 includes a generally planar surface 60, and at least one resilient biasing leaf 62 extending from the planar surface 60. In this example, the spring ring 14 includes six leafs 62 corresponding to the number of pawl recesses 32 and pawls 18. The planar surface 60 of the spring ring 14 is sized to be mounted inside the cavity 22 and abut one of the flange 24 or the cap 20. The spring ring 14 further defines an aperture 64 substantially corresponding to the size of the aperture 21.

When assembled, the leaf 62 of the spring ring 14 longitudinally extends into the corresponding pawl recess 32 between the upright face 39 of the pawl recess 32 and the flat surface of the end **18*b* of the pawl 18. In this manner, the spring ring 14 biases the pawl 18 away from the upright face 39 of the pawl recess, and towards the teeth 26 along the inner periphery of the cavity 22, thereby engaging the teeth 44 on the pawl 18 with the teeth 26 in the cavity 22**.

Figure 31:
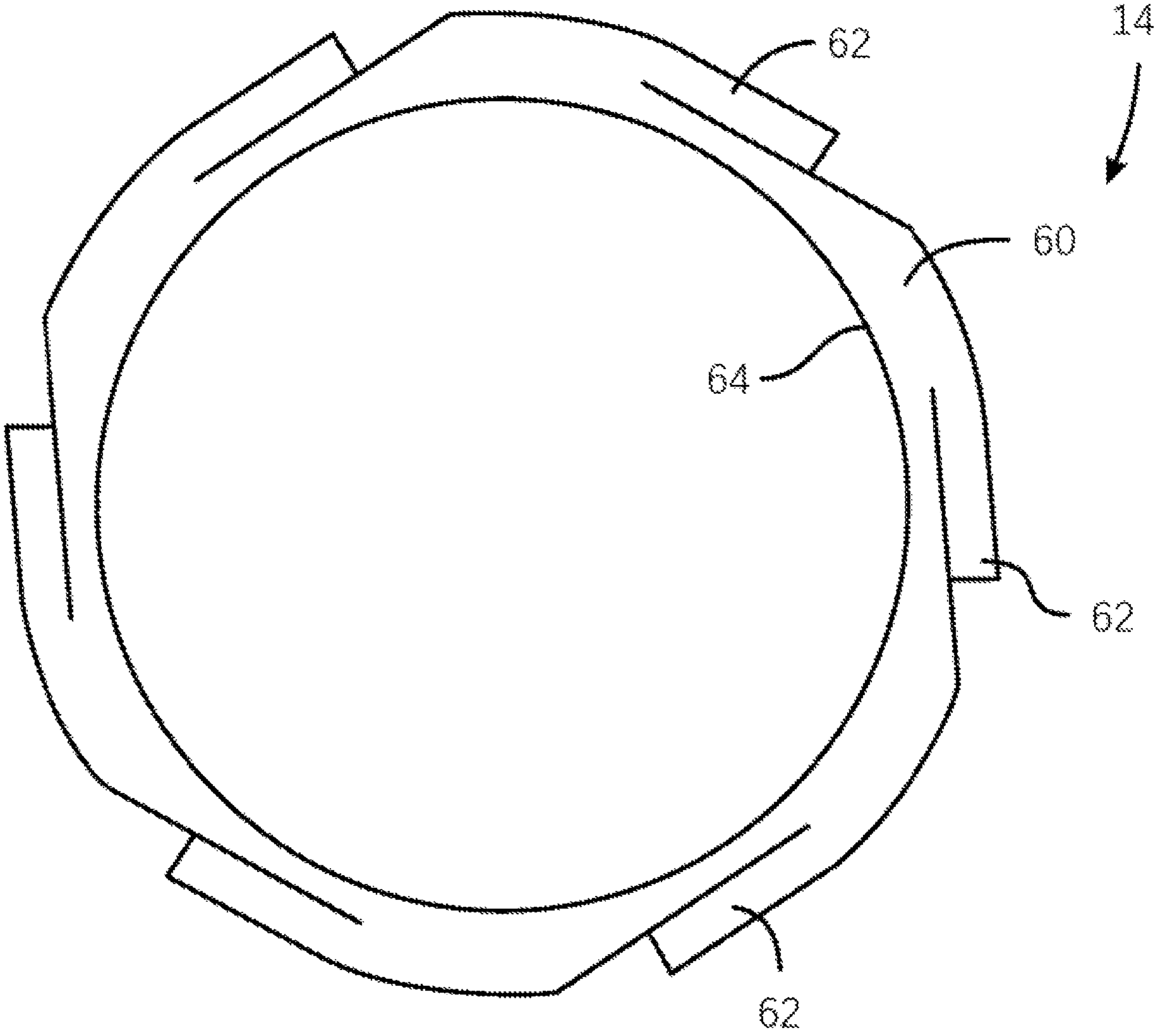
FIG. 31 is a top view of the spring ring of FIG. 30, prior to formation of a plurality of spring leafs.

As illustrated in FIG. 31, in one example, the spring ring 14 is manufactured from a single piece of resilient material through any suitable manufacturing technique, including for instance, stamping, etc. As shown, the leafs 62 may be cut and/or otherwise separated from the planar surface 60 and resiliently bent away from the surface 60 to form the resilient biasing leaf 62. The relative ease of manufacturing and the relative ease of assembling the components of the ratchet 10 will therefore be appreciated.

Figure 29:
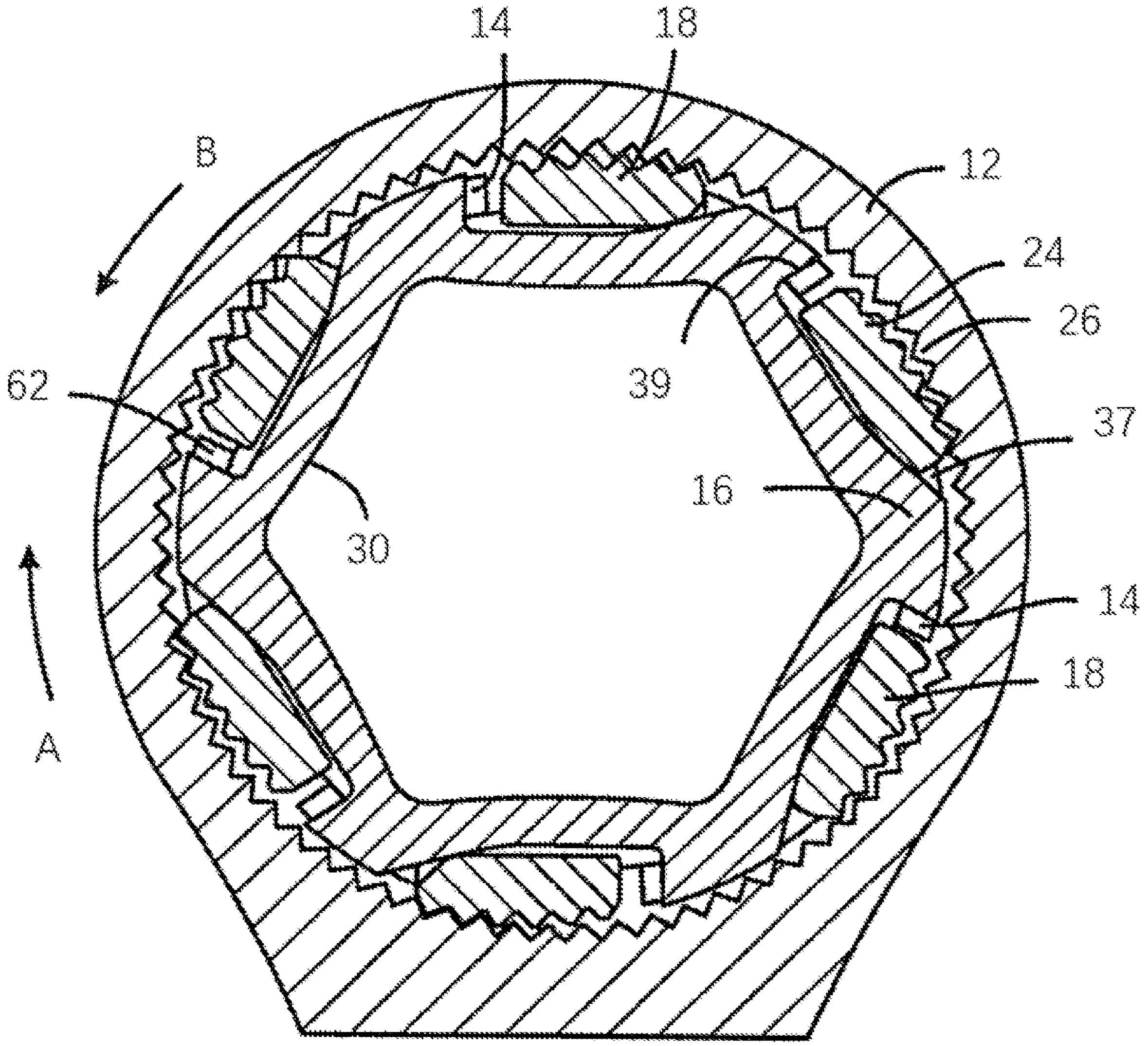
FIG. 29 is a cross-sectional top view of the ratchet taken along line C-C in FIG. 28.

With reference to the cross-sectional illustration of FIG. 29, in operation, the assembled ratchet wrench 10, and more particularly the socket 30 is placed over a nut or other suitable element and is engaged inside the socket 30. In the orientation illustrated in FIG. 4, the handle 12 is rotated in the direction of the arrow B (e.g., counterclockwise) to make the teeth 44 of the pawl 18 engage the teeth 26 of the cavity 22. Specifically, upon rotation of the handle 12 in the direction of the arrow B, the pawl 18, under a biasing force created by the leaf 62 is forced towards the teeth 26 and as rotation continues, is thus urged by the engagement of the teeth 26 and the pawl teeth 44 against the bias towards the upright face 39 of the wheel 16. The wheel 16 is therefore pushed by and rotates with the handle, thereby rotating the nut or other element engaged inside the socket 30.

Still referring to FIG. 29, when the handle is rotated in the direction of the arrow B (e.g., clockwise), the teeth 44 of the pawl 18 move along the teeth 26, sliding over the teeth 26 (i.e., ratcheting). In this instance, the wheel 16 does not rotate with the handle 12, and the ratchet wrench 10 does not rotate the nut or other element engaged inside the socket. To reverse the direction of the arrows A and B, the wrench 10 need only be turned over.

As can be seen in the example of FIG. 29, the six pawls 18 are divided into three sets **18*a*, 18*b* and 18*c*, each of the sets having two pawls 18 respectively. The sample pawl sets 18*a*, 18*b* and 18*c* are each clocked differently by the wheel 16 such that when one set of pawls 18*a* is engaged with the teeth 26, one of the other sets of pawls 18*b* is only partially engaged (e.g., half engaged) and the remaining set of pawls 18*c*** is disengaged.

Figure 36:
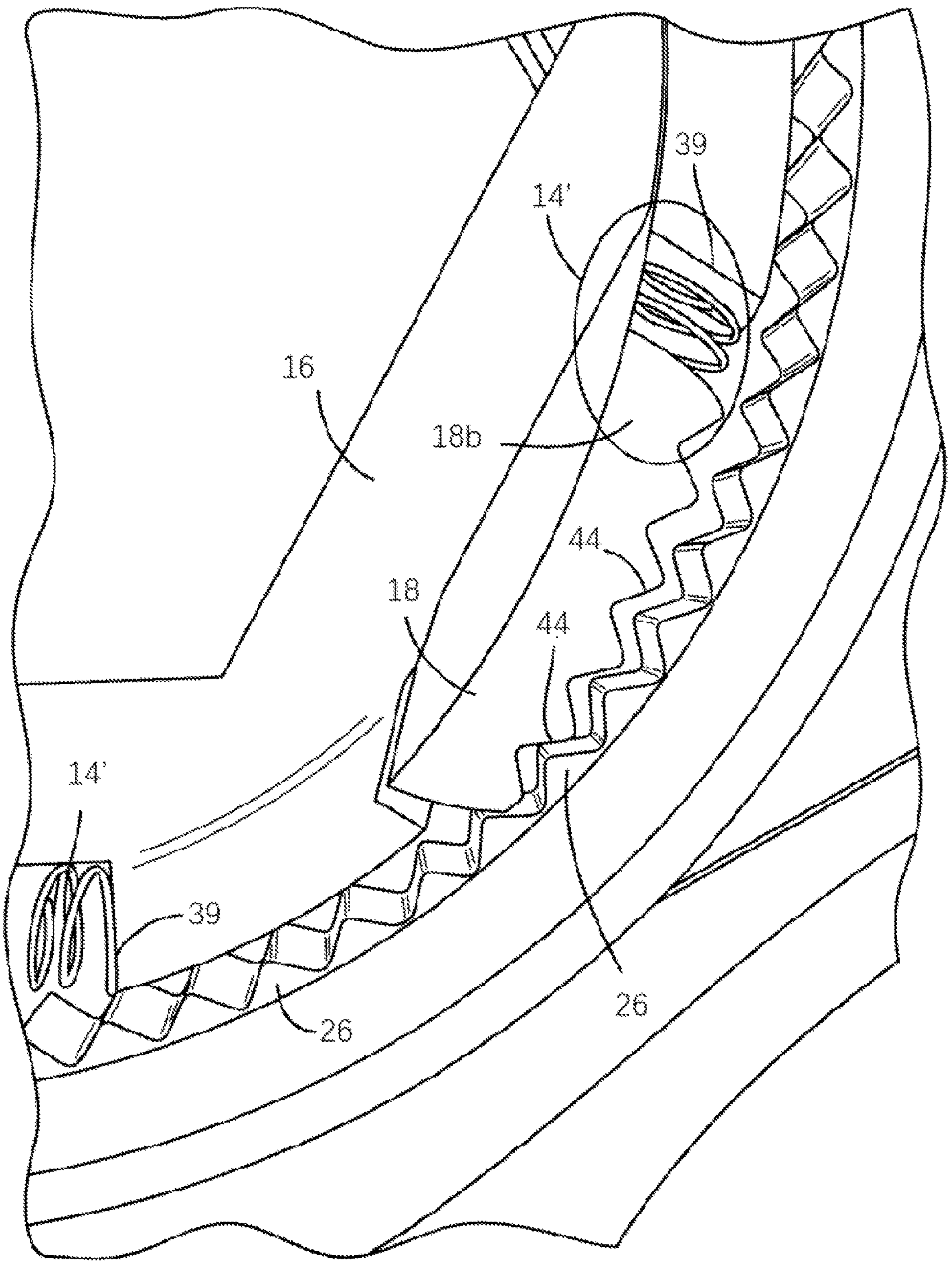
FIG. 36 is an enlarged top view of an example spring for use in the ratchet of FIG. 26.

Referring now to FIG. 36, there is illustrated another example spring 14' for use in the example wrench 10. The spring 14' may be used as an alternative to the spring ring 14 or may be used in addition to the spring ring 14 as desired. In this example, the spring 14' includes a coil spring located within at least one of the pawl recesses and between the upright face 39 of the wheel 16 and the corresponding flat surface of the end **18*b* of the pawl 18. In this manner, the spring 14' similarly biases the pawl 18 away from the upright face 39 of the pawl recess, and towards the teeth 26 along the inner periphery of the cavity 22, thereby engaging the teeth 44 on the pawl 18 with the teeth 26 in the cavity 22. As will be appreciated by one of ordinary skill in the art, the spring 14' and/or the spring ring 14 as disclosed herein may be any suitable spring for locating between the pawl and the upright face of the inner wheel and/or for biasing the pawl 18 into contact with the teeth 26 of the cavity 22**. For example, in alternative and/or in addition to the springs already disclosed, the bias may be provided by any resilient element including a resilient material, a torsion spring, a tension spring, a flat spring, leaf spring, helical spring, volute spring, or any other suitable biasing member.

Preferred specific embodiments of the present application have been described in detail above. It is to be understood that, those of ordinary skill in the art can make various modifications and changes based on the concept of the present application without exerting any creative effort. Accordingly, all the technical solutions that can be obtained by those skilled in the art by logical analysis, inference or limited experimentation in accordance with the concept of the present application on the basis of the prior art are intended to fall within the protection scope as defined by the claims.

The invention claimed is:

1. A ratchet wrench, comprising:

a handle;

a first member having an annular surface provided thereon with a plurality of teeth parallel to an axial direction thereof;

a second member configured to rotate circumferentially with respect to the annular surface, the second member having at least two recesses arranged circumferentially around the second member; and at least three first drive transmission members disposed in the respective recesses of the second member, each of the first drive transmission members comprising at least one ratchet tooth, the first drive transmission members configured to be engaged with the teeth to transmit movement in a first direction between the first member and the second member, wherein each of the first drive transmission members is in a different engagement configuration with the teeth, wherein one of the first member and the second member is coupled to the handle and configured to be driven by the handle to rotate;

wherein at least one of the first drive transmission members is fully engaged with the teeth; and at least two of the first drive transmission members are partially engaged with the teeth, wherein the at least two of the first drive transmission members partially engaged with the teeth are in different engagement configurations with the teeth.

2. The ratchet wrench of claim 1, wherein at least one of the first drive transmission members is disengaged from the teeth.

3. The ratchet wrench of claim 1, wherein the first drive transmission members are evenly distributed circumferentially around the first member.

4. The ratchet wrench of claim 1, wherein the ratchet wrench further comprises at least two second drive transmission members disposed in the respective recesses of the second member, each of the second drive transmission members comprising at least one ratchet tooth, the second drive transmission members configured to be able to be engaged with the teeth to transmit movement in a second direction between the first member and the second member, wherein each of the second drive transmission members is in a different engagement configuration with the teeth, wherein the second direction is opposite to the first direction, wherein when the first member and the second member move with respect to the first direction, the first drive transmission members are in a working state and the second drive transmission members are in a non-working state, and when the first member and the second member move with respect to the second direction, the second drive transmission members are in a working state and the first drive transmission members are in a non-working state.

5. The ratchet wrench of claim 4, wherein at least one of the second drive transmission members is fully engaged with the teeth; and at least one of the second drive transmission members is partially engaged with the teeth.

6. The ratchet wrench of claim 5, wherein at least two of the second drive transmission members are partially engaged with the teeth, wherein the at least two of the second drive transmission members partially engaged with the teeth are in different engagement configurations with the teeth.

7. The ratchet wrench of claim 5, wherein at least one of the second drive transmission members is disengaged from the teeth.

8. The ratchet wrench of claim 5, wherein the second drive transmission members are evenly distributed circumferentially around the first member.

9. The ratchet wrench of claim 4, wherein each of the recesses defines opposing a first opening and a second opening in a circumferential periphery of the second member and is provided therein with one pair of first drive transmission member and second drive transmission member; ratchet tooth of each of the first drive transmission members extends out of the first opening; and ratchet tooth of each of the second drive transmission members extends out of the second opening.

10. The ratchet wrench of claim 9, wherein a resilient biasing element is disposed between the pair of first drive transmission member and second drive transmission member.

11. The ratchet wrench of claim 10, wherein the resilient biasing element is a coil spring.

12. A ratchet wrench, comprising:

a handle;

a first member having an annular surface provided thereon with a plurality of teeth parallel to an axial direction thereof;

a second member configured to rotate circumferentially with respect to the annular surface, the second member having a plurality of recesses arranged circumferentially around the second member; and a plurality of first drive transmission members each disposed in one of the plurality of recesses, each of the first drive transmission members comprising at least one ratchet tooth, the first drive transmission members configured to be engaged with the teeth to transmit movement in a first direction between the first member and the second member, wherein when the second member rotates in the first direction relative to the first member, at least one of the plurality of first drive transmission members is fully engaged with the teeth, and at least two of the plurality of first drive transmission members are partially engaged with the teeth, wherein the at least two of the plurality of first drive transmission members partially engaged with the teeth are in different engagement configurations with the teeth, wherein one of the first member and the second member is coupled to the handle and configured to be driven by the handle to rotate.

13. The ratchet wrench of claim 12, wherein the ratchet wrench further comprises a plurality of second drive transmission members; each of the plurality of first drive transmission members is disposed in one of the plurality of recesses; each of the second drive transmission members comprises at least one ratchet tooth; the second drive transmission members are configured to be engaged with the teeth to transmit movement in a second direction between the first member and the second member, wherein when the second member rotates in the second direction relative to the first member, at least one of the plurality of second drive transmission members is fully engaged with the teeth, and the remaining plurality of second drive transmission members are partially engaged with the teeth, and the second direction is opposite to the first direction.

* * * * *